United States Patent
Nagase

(10) Patent No.: US 11,288,580 B2
(45) Date of Patent: Mar. 29, 2022

(54) OPTIMAL SOLUTION SEARCH METHOD, OPTIMAL SOLUTION SEARCH PROGRAM, AND OPTIMAL SOLUTION SEARCH APPARATUS

(71) Applicant: FUJIFILM Corporation, Tokyo (JP)

(72) Inventor: Masaya Nagase, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 16/054,684

(22) Filed: Aug. 3, 2018

(65) Prior Publication Data
US 2019/0065963 A1    Feb. 28, 2019

(30) Foreign Application Priority Data
Aug. 31, 2017    (JP) .............................. JP2017-166769

(51) Int. Cl.
| | |
|---|---|
| G06N 5/00 | (2006.01) |
| G06F 17/11 | (2006.01) |
| G06F 16/901 | (2019.01) |
| G06F 16/903 | (2019.01) |
| G06N 7/00 | (2006.01) |

(52) U.S. Cl.
CPC ........... *G06N 5/003* (2013.01); *G06F 16/901* (2019.01); *G06F 16/90335* (2019.01); *G06F 17/11* (2013.01); *G06N 7/005* (2013.01)

(58) Field of Classification Search
CPC ................................ G06N 5/003; G06F 17/11
See application file for complete search history.

(56) References Cited

U.S. PATENT DOCUMENTS

| | | | |
|---|---|---|---|
| 6,363,368 B2 * | 3/2002 | Shinagawa | G06N 3/126 706/13 |
| 9,311,383 B1 * | 4/2016 | Karty | G06F 16/903 |
| 2006/0112044 A1 * | 5/2006 | Le Huede | G06F 17/18 706/46 |

(Continued)

FOREIGN PATENT DOCUMENTS

| | | |
|---|---|---|
| JP | 2010-186425 A | 8/2010 |
| JP | 5987530 B2 | 9/2016 |

*Primary Examiner* — Mark D Featherstone
*Assistant Examiner* — Tony Wu
(74) *Attorney, Agent, or Firm* — Birch, Stewart, Kolasch & Birch, LLP.

(57) ABSTRACT

An optimal solution search method for searching for an optimal solution in a combinatorial optimization problem using a computer, includes: acquiring a first solution candidate; and enumerating and indexing solution candidate groups of which the degree of divergence from the first solution candidate is equal to or smaller than a predetermined range; equally extracting second solution candidates from the enumerated and indexed solution candidate groups assigning evaluation values to the second solution candidates; and determining whether the search for the optimal solution is terminated on the basis of the evaluation value. In a case where the search for the optimal solution is not terminated, the current first solution candidate is updated as the best second solution candidate selected from the second solution candidates, and the processes are repeated until the search for the first optimal solution is terminated.

16 Claims, 19 Drawing Sheets

(56) References Cited

U.S. PATENT DOCUMENTS

| | | | |
|---|---|---|---|
| 2015/0096370 A1* | 4/2015 | Lin | B64C 27/008 73/455 |
| 2016/0071021 A1* | 3/2016 | Raymond | G06N 10/00 712/28 |
| 2016/0132637 A1* | 5/2016 | Varadan | G16B 30/00 702/19 |
| 2016/0350072 A1* | 12/2016 | Fox | G06F 7/468 |

* cited by examiner

FIG. 9

| (G) | A | B | C | D | Σ |
|---|---|---|---|---|---|
| (1) | 1 | 0 | 0 | 0 | 1 |
| (2) | 1 | 0 | 1 | 0 | 1 |
| (3) | 0 | 0 | 1 | 0 | 1 |
| (4) | 0 | 1 | 0 | 1 | 1 |
| Σ | 1 | 1 | 1 | 1 | 1 |

OK(1)　{G₁, G₃, G₄}　Ⓐ Ⓑ Ⓒ Ⓓ

← DETERMINATION ROW

| (G) | A | B | C | D | Σ |
|---|---|---|---|---|---|
| (1) | 1 | 0 | 0 | 0 | 0 |
| (2) | 1 | 0 | 1 | 0 | 0 |
| (3) | 0 | 0 | 1 | 0 | 1 |
| (4) | 0 | 1 | 0 | 1 | 1 |
| Σ | 0 | 1 | 1 | 1 | 0 |

NG(0)　{G₃, G₄}　Ⓑ Ⓒ Ⓓ

| (G) | A | B | C | D | Σ |
|---|---|---|---|---|---|
| (1) | 1 | 0 | 0 | 0 | 0 |
| (2) | 1 | 0 | 1 | 0 | 1 |
| (3) | 0 | 0 | 1 | 0 | 1 |
| (4) | 0 | 1 | 0 | 1 | 1 |
| Σ | 1 | 1 | 2 | 1 | 0 |

NG(0)　{G₂, G₃, G₄}　Ⓐ Ⓑ Ⓒ Ⓓ

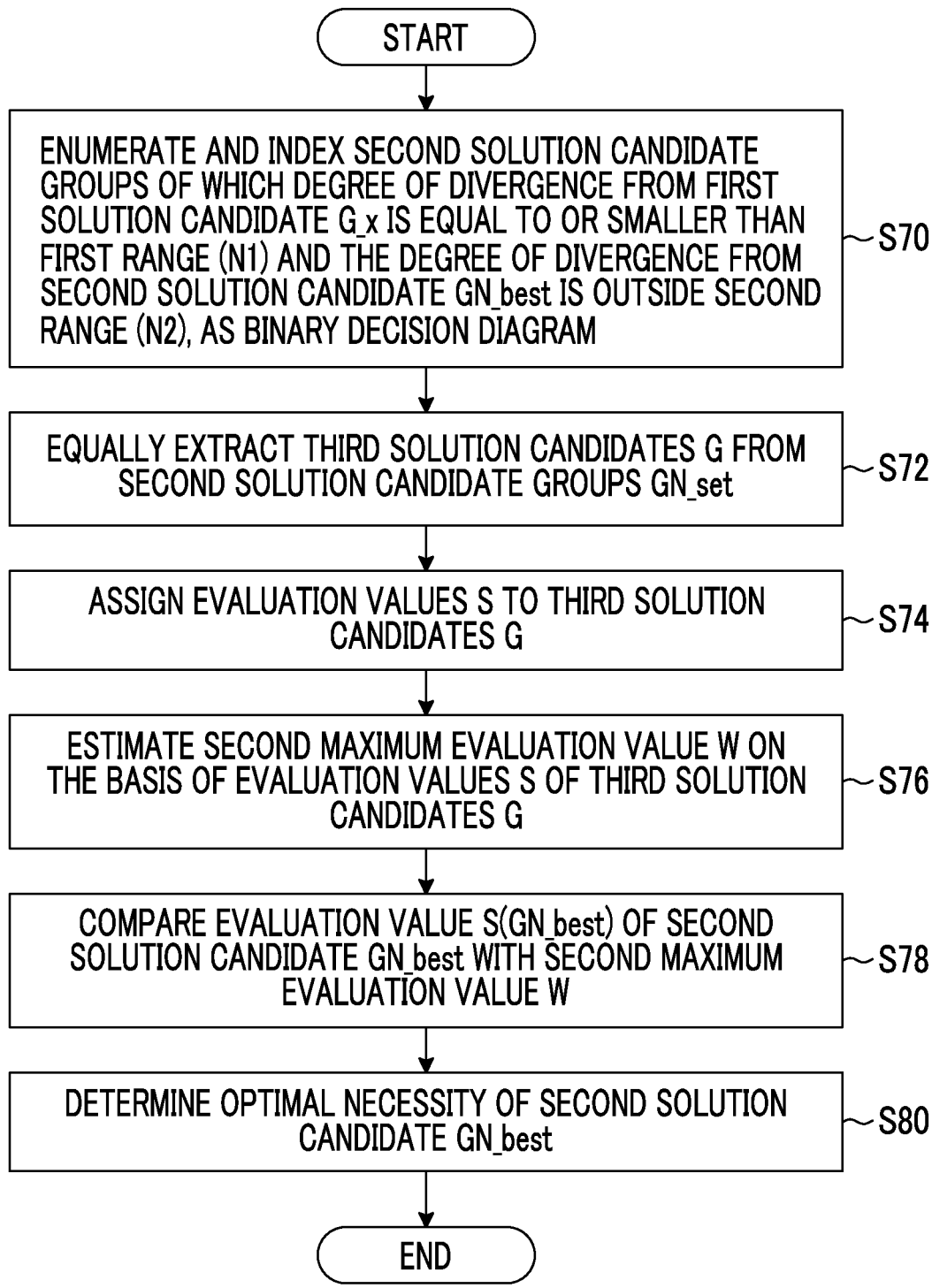

OPTIMAL SOLUTION SEARCH METHOD, OPTIMAL SOLUTION SEARCH PROGRAM, AND OPTIMAL SOLUTION SEARCH APPARATUS

CROSS-REFERENCE TO RELATED APPLICATIONS

The present application claims priority under 35 U.S.C. § 119 to Japanese Patent Application No. 2017-166769, filed on Aug. 31, 2017, all of which are hereby expressly incorporated by reference into the present application.

BACKGROUND OF THE INVENTION

1. Field of the Invention

The present invention relates to an optimal solution search method, non-transitory computer readable recording medium storing an optimal solution search program, and an optimal solution search apparatus, and particularly, to a technique for searching for an optimal solution among solutions in a combinatorial optimization problem.

2. Description of the Related Art

In recent years, needs of data analysis, such as data search with respect to big data, have been increasing. As one of important data analysis field problems, there is a combinatorial optimization problem (in which a traveling salesman problem or the like that is known from the past is included, for example).

The combinatorial optimization problem includes a large number of difficult problems such as a non-deterministic polynomial time (NP)-complete problem or an NP-hard problem. That is, in a case where the scale of a problem becomes large, since the amount of computation explodes in an order of an exponential function or greater, analysis based on comprehensive full search is almost impossible.

For example, in a drug discovery field, acquisition of a large amount of gene data (for example, ribonucleic acid (RNA) expressed matrix data) has become possible by a next generation sequencer (NGS) that has been recently developed, for example. Analysis of big data acquired in this way has been spotlighted as bioinformatics. For example, there is a trial for clarifying a mechanism of action of a chemical agent based on a biological function. As one of such trials, there is estimation of a gene control network. The gene control network refers to an analysis method for comprehending a system in which genes mutually adjust expression levels as a stochastic graph model such as a Bayesian network.

In the gene control network, a graph in which a gene is a node and a control relationship is an edge is considered. Further, a graph search problem for calculating the degree to which RNA expressed matrix data obtained by a graph structure can be explained and searching for a graph that is most suitable for the obtained data should be solved. However, with respect to the number of genes N, the number of possible graphs is $2^{(N[<]BEGINITALm2)}$, and diverges ultra-exponentially as N increases. Further, in the Bayesian network model, a complicated restriction condition such as a directed acyclic graph (DAG) restriction should be also considered. In a case where the number of genes becomes large to some extent, it is difficult to extract an entire solution space even with a zero-suppressed binary decision diagram (ZDD).

Further, in association with the combinatorial optimization problem, a data structure called a ZDD is present, and it can be understood that enormously large scale combination sets can be efficiently indexed by an organization algorithm called a frontier model, which has been actively researched in recent years. The ZDD may be used as means for extracting entire solution candidates of a combinatorial optimization problem and efficiently and uniformly extracting solution candidates therefrom.

With respect to the combinatorial problem, various methods for heuristically calculating approximate solutions have been developed for application. As a method that is frequently used, there is a greedy hill-climbing method. In this method, a certain initial solution $S\_0$ is given with respect to a solution space $\{S\}$, and then, a solution candidate group $\{S\_0+\}$ of the degree of divergence 1 from the initial solution $S\_0$ is evaluated using a round robin algorithm to quantify a fidelity $\{P\_0+\}$. Then, a maximum (or minimum) solution $S\_1$ is selected therefrom. In this method, the processes are repeated until the fidelity is not improved. On the other hand, it is said that this method has a disadvantage of easily falling into a localized solution, and thus, various modification methods have been proposed.

As one of improved methods, there is a method for enumerating solution candidates of the degree of divergence N, instead of the degree of divergence 1, in entering the next step. However, in this method, as the degree of divergence N becomes large, the number of next solution candidate groups explosively increases. Thus, particularly, in a complicated restriction condition, the enumeration itself becomes difficult. Further, in a case where the number of solution candidate groups is extremely large, it is difficult to uniformly search the solution candidate groups.

For example, JP2010-186425A has proposed a data processing method for calculating an optimal solution for determining a combination state to be transitioned from a combination state defined as an adjacent state after departing from an initial combination state, and sequentially repeating the transition of the combination state to perform search for a network configuration, in order to calculate an optimal combination state. The data processing method includes defining a problem specific distance (the degree of divergence) that is a distance between problem specific states, performing the transition with a large degree of divergence several times at a time point at which an improvement rate of an evaluation function value due to search becomes a predetermined value or smaller, performing search while limiting to state changes with a small degree of divergence in a predetermined number of times of search, and repeating the processes to continue the search.

Further, a research for utilizing the ZDD in a search algorithm of the combinatorial optimization problem has been developed.

For example, Japanese Patent No. 5987530 has proposed a method for efficiently solving a knapsack (packaging) problem using the ZDD or a binary decision diagram (BDD).

A knapsack problem support device disclosed in Japanese Patent No. 5987530 is configured to store a binary decision diagram indicating a set of combination patterns of the number of package items, which is generated from restrictions of combinations of the number of package items capable of being packaged and is obtained by developing the restrictions of the combinations of the number of package items capable of being packaged in a binary decision diagram information storage section, to determine, in a case where a combination pattern of the number of package items designated by a user is acquired, whether or not the acquired combination pattern of the number of package items can be packaged through search using the binary decision diagram stored in the binary decision diagram information storage section.

SUMMARY OF THE INVENTION

In searching for an optimal solution in a combinatorial optimization problem, it is difficult to efficiently search the next solution candidate with respect to a solution candidate group with a large degree of divergence from an original solution candidate, and particularly, in a case where the number of solution candidate groups with the large degree of divergence exceeds an evaluable number, it is not possible to perform search for equivalent solution candidates.

JP 2010-186425A discloses the method for determining a combination state to be transitioned in consideration of an improvement rate in addition to a combination state and the degree of divergence (problem specific distance) has been proposed, but does not review efficient solution means with respect to how to comprehend a solution in an adjacent state with a certain degree of divergence.

Further, Japanese Patent No. 5987530 discloses the method for effectively solving the knapsack problem using the ZDD or BDD, but this method is used for directly extracting a solution, and cannot handle a case where entire solutions cannot be extracted, differently from the knapsack problem.

In consideration of such a problem, an object of the invention is to provide an optimal solution search method, non-transitory computer readable recording medium storing an optimal solution search program, and an optimal solution search apparatus capable of efficiently searching for an optimal solution in a combinatorial optimization problem with high accuracy.

In order to achieve the above object, according to an aspect of the invention, there is provided an optimal solution search method for searching for an optimal solution in a combinatorial optimization problem using a computer, including: a first step of acquiring at least one solution among solutions that belong to a solution space of the combinatorial optimization problem as a first solution candidate; a second step of assigning an evaluation value to the first solution candidate; a third step of enumerating and indexing solution candidate groups of which the degree of divergence from the first solution candidate is equal to or smaller than a first range as a binary decision diagram, in which the binary decision diagram has a data structure in which, using at least one of a step of identifying whether to decide, on the basis of a part of combinations among combinable patterns in the combinatorial optimization problem, solutions to be unsuitable without consideration of the remaining combinations to reduce patterns to be identified and a step of extracting a common portion of pattern groups in which a difference is present in only a part of combinations among the combinable patterns and sharing the remaining combinations to reduce patterns to be identified, the combinable patterns are contracted to be enumerated and indexed; a fourth step of equally extracting a part or the entirety of the solution candidate groups from the enumerated and indexed solution candidate groups as second solution candidates; a fifth step of assigning evaluation values to the extracted second solution candidates; and a sixth step of determining whether search for a first optimal solution is terminated on the basis of the evaluation value of the first solution candidate and one or more evaluation values among the evaluation values of the second solution candidates, in which in a case where it is determined that the search for the first optimal solution is not terminated, at least one solution candidate selected from the second solution candidates and different from the first solution candidate is updated as the first solution candidate and the processes from the third step to the sixth step are repeated, and in a case where it is determined that the search for the first optimal solution is terminated, the first solution candidate that is assigned the evaluation value for which it is determined that the search for the first optimal solution is terminated is output as the first optimal solution.

According to this aspect of the invention, at least one solution among solutions that belong to a solution space of a combinatorial optimization problem is set as a first solution candidate, an evaluation value is assigned to the first solution candidate, and solution candidate groups of which the degree of divergence from the first solution candidate is equal to or smaller than a first range are enumerated and indexed as a binary decision diagram. The binary decision diagram has a data structure in which, using at least one of a step of identifying whether to decide, on the basis of a part of combinations among combinable patterns in the combinatorial optimization problem, solutions to be unsuitable without consideration of the remaining combinations to reduce patterns to be identified (to contract the combinable patterns by a so-called "tree pruning") and a step of extracting a common portion of pattern groups in which a difference is present in only a part of combinations among the combinable patterns and sharing the remaining combinations to reduce patterns to be identified (to contract the combinable patterns by a so-called "node sharing"), the combinable patterns are contracted to be enumerated and indexed. The data structure has a data structure of a zero-suppressed binary decision diagram (ZDD) or a data structure similar to the ZDD, for example.

Further, a part or the entirety of the solution candidate groups are equally extracted from the enumerated and indexed solution candidate groups as second solution candidates, evaluation values are given to the equally extracted second solution candidates, and it is determined whether search for a first optimal solution is terminated on the basis of the evaluation value of the first solution candidate and one or more evaluation values among the evaluation values of the second solution candidates. In a case where it is determined that the search for the first optimal solution is not terminated, at least one solution candidate selected from the second solution candidates and different from the first solution candidate is updated as the first solution candidate, and thus, the solution candidate groups of which the degree of divergence from the new first solution candidate is within the first range are enumerated and indexed as a binary decision diagram, and the search for the first optimal solution is repeated. On the other hand, in a case where it is determined that the search for the first optimal solution is terminated, the first solution candidate that is assigned the evaluation value for which it is determined that the search for the first optimal solution is terminated is output as the first optimal solution (optimal solution).

Thus, even in a wide solution space (solution candidate groups with a large degree of divergence from the first solution candidate), it is possible to search an optimal solution by efficiently enumerating and indexing the solution candidate groups. Further, even in a case where the number of solution candidate groups exceeds an evaluable number, it is possible to perform equal extraction, to thereby perform equivalent search.

According to another aspect of the invention, it is preferable that the optimal solution search method further comprises: a seventh step of receiving a restriction condition of one or more solution candidates, in which the third step is performed for enumerating and indexing the solution candidate groups of which the degree of divergence from the first solution candidate is equal to or smaller than the first range, which satisfies the restriction condition, as a binary decision diagram. In a case where solution search is performed in a state where the restriction condition is imposed, introduction of the ZDD or a data structure similar to the ZDD can lead to a larger effect.

According to still another aspect of the invention, in the optimal solution search method, it is preferable that the degree of divergence of the first range is equal to or greater than 1 and is equal to or smaller than a maximum degree of divergence in which the enumeration and indexing as the binary decision diagram is possible.

According to still another aspect of the invention, in the optimal solution search method, it is preferable that the degree of divergence of the first range is a constant value or a value that varies whenever the first solution candidate is updated.

According to still another aspect of the invention, in the optimal solution search method, it is preferable that the sixth step is performed for determining that the search for the first optimal solution is terminated in a case where the evaluation value of the first solution candidate is equal to or greater than the evaluation values of all the second solution candidates, in a case where a difference between each second solution candidate and the first solution candidate is equal to or smaller than a predetermined value, or in a case where the number of repetitions of the processes of the third step to the sixth step reaches a predetermined number of times. This is because the solution candidates (the second solution candidates) having evaluation values higher than that of the current first solution candidate are not searched for, the degree of improvement of the evaluation values becomes small, or the search is terminated.

According to still another aspect of the invention, in the optimal solution search method, it is preferable that a solution candidate different from the first solution candidate, which is updated as the first solution candidate, is a second solution candidate that is assigned a maximum evaluation value among the second solution candidates. Thus, the first solution candidate can be gradually updated to a solution candidate having an evaluation value higher than that of the current first solution candidate, and can finally reach the first optimal solution.

According to still another aspect of the invention, in the optimal solution search method, it is preferable that the sixth step includes an eighth step of estimating a maximum evaluation value in a case where solutions of a number that exceeds the number of the second solution candidates are assumed as a first maximum evaluation value, on the basis of the evaluation values of the second solution candidates assigned in the fifth step, and a ninth step of determining whether the evaluation value of each second solution candidate is within a confidence interval of the first maximum evaluation value, and that the sixth step is performed for determining whether the search for the first optimal solution is terminated on the basis of the evaluation values of the second solution candidates determined to be within the evaluation value of the first solution candidate and the confidence interval of the first maximum evaluation value.

According to still another aspect of the invention, the optimal solution search method further comprises estimating a maximum evaluation value in a case where solutions of a number that exceeds the number of the second solution candidates are assumed as a first maximum evaluation value, on the basis of the evaluation values of the second solution candidates assigned in the fifth step, and determining whether the evaluation value of each second solution candidate is within a confidence interval of the first maximum evaluation value (whether the second solution candidate is one of solution candidates having a maximum evaluation value among the solution candidate groups). Thus, it is possible to perform statistic optimality determination of solutions in a combinatorial optimization problem. Further, it is possible to perform optimality determination whether the equally extracted second solution candidates satisfy a sufficient condition as solution candidates having a maximum evaluation value, among solution candidate groups of which the degree of divergence from the first solution candidate is equal to or smaller than the first range.

According to still another aspect of the invention, in the optimal solution search method, it is preferable that the equally extracted second solution candidates are U×V solutions, where U and V are natural numbers, respectively, and that the eighth step includes dividing the U×V solutions into V blocks, acquiring V segment maximum values of evaluation values of U solutions for each block, and estimating the first maximum evaluation value using the V segment maximum values on the assumption that the segment maximum values follow a generalized extreme value distribution. V segment maximum values of evaluation values of U solutions are obtained for each block, and assuming that the V segment maximum values follow a generalized extreme value distribution (GEV), a maximum evaluation value (first maximum evaluation value) is estimated with a maximum likelihood.

According to still another aspect of the invention, in the optimal solution search method, it is preferable that a first search method in which the cost for computation is small and the accuracy of a solution is low and a second search method in which the cost for computation is larger than that of the first search method and the accuracy of a solution is high are prepared, and that the third step is performed for enumerating and indexing solutions that are first searched for by the first search method as the solution candidate groups, and for enumerating and indexing solutions searched by the second search methods as the solution candidate groups only in a case where the evaluation values of the second solution candidates are not within the confidence interval of the first maximum evaluation value.

In a case where solutions that are first searched for by the first search method in which the cost for computation is small and the accuracy of the solution is low are enumerated and indexed, and the second solution candidates included in the solution candidates do not satisfy the sufficiency condition, so that the optimal sufficiency determination fails, it may be suggested that there is another optimal solution due to insufficient heuristic search based on the first search method. In such a case, the search for the second solution candidates based on the first search method is switched to that based on the second search method in which the cost for computation is large and the accuracy of the solution is high, and solutions searched for by the second search method are enumerated and indexed as solution candidate groups to determine sufficiency of the second solution candidates.

According to another aspect of the invention, it is preferable that the optimal solution search method further comprises: a tenth step of enumerating and indexing, among the second solution candidate groups that are included in the solution candidate groups of which the degree of divergence from the first solution candidate is equal to or smaller than the first range, the second solution candidate groups of which the degree of divergence from the second solution candidate of which the evaluation value is determined to be within the confidence interval of the first maximum evaluation value is outside a second range that is narrower than the first range as a binary decision diagram, in which the binary decision diagram has a data structure in which, using at least one of a step of identifying whether to decide, on the basis of a part of combinations among combinable patterns in the combinatorial optimization problem, solutions to be unsuitable without consideration of the remaining combinations to reduce patterns to be identified and a step of extracting a common portion of pattern groups in which a difference is present in only a part of combinations among the combinable patterns and sharing the remaining combinations to reduce patterns to be identified, the combinable patterns are contracted to be enumerated and indexed; an eleventh step of equally extracting a part or the entirety of the second solution candidate groups from the enumerated and indexed second solution candidate groups as third solution candidates; a twelfth step of assigning evaluation values to the extracted third solution candidates; a thirteenth step of estimating a maximum evaluation value in a case where solutions of a number that exceeds the number of the third solution candidates are assumed on the basis of the evaluation values of the third solution candidates assigned in the twelfth step as a second maximum evaluation value; and a fourteenth step of determining whether the evaluation values of the second solution candidates that are within the confidence interval of the first maximum evaluation value exceed the second maximum evaluation value.

According to still another aspect of the invention, among the second solution candidate groups that are included in the solution candidate groups of which the degree of divergence from the first solution candidate is equal to or smaller than the first range, the second solution candidate groups of which the degree of divergence from the second solution candidate of which the evaluation value is determined to be within the confidence interval of the first maximum evaluation value is outside the second range that is narrower than the first range are numerated and indexed as the binary decision diagram. The binary decision diagram is a ZDD, or has a data structure similar to the ZDD. Further, a part or the entirety of the second solution candidate groups are equally extracted from the enumerated and indexed second solution candidate groups as third solution candidates, evaluation values are assigned to the third solution candidates, and a maximum evaluation value in a case where solutions of a number that exceeds the number of the third solution candidates are assumed is estimated as a second maximum evaluation value on the basis of the evaluation values of the third solution candidates. By determining whether the evaluation values of the second solution candidates that are within the confidence interval of the first maximum evaluation value exceed the second maximum evaluation value, it is possible to perform optimality determination relating to whether solutions in a combinatorial optimization problem satisfy a necessary condition. In a case where the evaluation values of the second solution candidates that are within the confidence interval of the first maximum evaluation value exceed the second maximum evaluation value, the second solution candidates satisfy a necessary sufficient condition, and an optimal solution is obtained within the first range of the degree of divergence from the first solution candidate, which means that other equivalent solutions are not present.

According to still another aspect of the invention, in the optimal solution search method, it is preferable that the equally extracted third solution candidates are P×Q solutions, where P and Q are natural numbers, respectively, and the thirteenth step includes dividing the P×Q solutions into Q blocks, acquiring Q segment maximum values of evaluation values of P solutions for each block, and estimating the second maximum evaluation value on the assumption that the segment maximum values follow a generalized extreme value distribution using the Q segment maximum values. Q segment maximum values of evaluation values of P for each block solutions are obtained, and assuming that the Q segment maximum values follow a generalized extreme value distribution, a maximum evaluation value (second maximum evaluation value) is estimated with a maximum likelihood.

According to still another aspect of the invention, in the optimal solution search method, it is preferable that in a case where it is determined in the fourteenth step that the evaluation values of the second solution candidates that are within the confidence interval of the first maximum evaluation value do not exceed the second maximum evaluation value, the processes from the tenth step to the fourteenth step are performed by applying a third range obtained by enlarging the second range instead of the second range.

In a case where the evaluation value of the second solution candidate that is searched for as one optimal solution does not exceed the second maximum evaluation value within the first range of the degree of divergence from the first solution candidate, there is a possibility that an equivalent solution is present within the first range of the degree of divergence from the first solution candidate. In this case, the third range obtained by enlarging the second range instead of the second range is applied to estimate again the second maximum evaluation value using solution candidate groups that are further separated from the first solution candidate. Thus, it is possible to confirm that an equivalent solution is not present in the solution candidate groups separated from the second solution candidate (with a large degree of divergence) that is searched for as one optimal solution.

According to still another aspect of the invention, in the optimal solution search method, it is preferable that the combinatorial optimization problem is a combinatorial optimization problem of a gene control network.

According to still another aspect of the invention, there is provided non-transitory computer readable recording medium storing an optimal solution search program for causing a computer to execute the above-described optimal solution search method.

According to still another aspect of the invention, there is provided an optimal solution search apparatus that searches an optimal solution in a combinatorial optimization problem, including: a solution candidate acquisition section that acquires at least one solution among solutions that belong to a solution space of the combinatorial optimization problem as a first solution candidate; an enumeration indexing section that enumerates and indexes solution candidate groups of which the degree of divergence from the first solution candidate is equal to or smaller than a first range as a binary decision diagram, in which the binary decision diagram has a data structure in which, using at least one of a step of identifying whether to decide, on the basis of a part of combinations among combinable patterns in the combinatorial optimization problem, solutions to be unsuitable without consideration of the remaining combinations to reduce patterns to be identified and a step of extracting a common portion of pattern groups in which a difference is present in only a part of combinations among the combinable patterns and sharing the remaining combinations to reduce patterns to be identified, the combinable patterns are contracted to be enumerated and indexed; a solution candidate extraction section that equally extracts a part or the entirety of the solution candidate groups from the enumerated and indexed solution candidate groups as second solution candidates; an evaluation value assignment section that assigns evaluation values to the first solution candidate and the second solution candidates, respectively; a search termination determining section that determines whether search for a first optimal solution is terminated on the basis of the evaluation value of the first solution candidate and one or more evaluation values among the evaluation values of the second solution candidates; a controller that updates a solution candidate different from the first solution candidate, which is at least one solution candidate selected from the second solution candidates, as the first solution candidate and repeatedly executes processes of the solution candidate extraction section, the evaluation value assignment section, and the search termination determining section, in a case where it is determined that the search for the first optimal solution is not terminated; and an output unit that outputs, in a case where it is determined that the search for the first optimal solution is terminated, the first solution candidate that is assigned the evaluation value for which it is determined that the search is terminated as the first optimal solution.

According to still another aspect of the invention, it is preferable that the optimal solution search apparatus further comprises a restriction condition reception section that receives a restriction condition of one or more solution candidates, in which the enumeration indexing section enumerates and indexes the solution candidate groups of which the degree of divergence from the first solution candidate is equal to or smaller than the first range, which satisfies the restriction condition, as a binary decision diagram.

According to the invention, even in a wide solution space, it is possible to efficiently enumerate and index solution candidate groups to search an optimal solution. Further, even in a case where the number of solution candidate groups exceeds an evaluable number, it is possible to perform equal extraction, to thereby perform equivalent search (mining with high accuracy).

BRIEF DESCRIPTION OF THE DRAWINGS

FIG. 9 is a diagram showing three examples of "patterns" corresponding to selections of subsets and determination results indicating whether each "pattern" satisfies a condition.

FIG. 22 is a flowchart showing a second determination method of the second solution candidate GN_best in step S20 shown in FIG. 18.

DESCRIPTION OF THE PREFERRED EMBODIMENTS

Hereinafter, preferred embodiments of an optimal solution search method, an optimal solution search program, and an optimal solution search apparatus according to the invention will be described with reference to the accompanying drawings.

<Outline of the Invention>

As a method for searching for a solution in a combinatorial optimization problem, a gene control network that is applicable to a drug discovery field will be described as an example. As the gene control network, for example, an application for reading and solving an action mechanism of a chemical agent, for example, by expressing a cooperative relationship between genes as a directed diagram is expected.

First, basic preconditions will be described.

Figure 1:
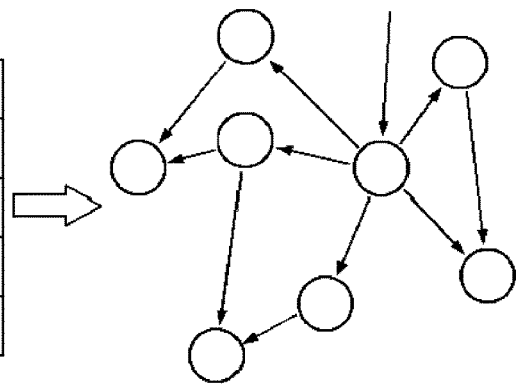
FIG. 1 is a diagram including a table showing RNA expressed matrix data and a diagram showing a gene control network.

(1) FIG. 1 is a diagram including a table showing RNA expressed matrix data and a diagram showing a gene control network.

In FIG. 1, A, B, . . . , and Z represent genes, and X1, X2, . . . , and Xn represent samples, in which data corresponding to a product of the number of genes and the number of samples is present. RNA expressed matrix data thereof is acquired. The RNA expressed matrix data may be coverage data based on an NGS, or may be signal data based on a micro-array.

In an RNA expressed matrix, an RNA expression level of N genes is measured with respect to M cell lines, or the like, in which data x(m, n) represents an expression level of a gene n in a cell line m. Accordingly, RNA expressed matrix data D becomes M×N numerical value matrix data.

(2) Relevance of a plurality of genes may be expressed as a gene control network. Hereinafter, the gene control network is expressed as a graph G. As shown in FIG. 1, the graph G shows a set of edges (control relationships between nodes (genes) indicated by arrows). Here, for example, g1={(A, B), (A, C), (C, D)} represents that three control relationships of "gene A to gene B", "gene A to gene C", and "gene C to gene D" are present. The graph G may be estimated from the RNA expressed matrix data D in multiple samples.

Here, on the graph G, a certain restriction condition C in association with a problem is imposed. The restriction condition C is imposed on the basis of a model or a prior knowledge. For example, since a cyclic graph cannot be expressed in a Bayesian network model, the graph G should not be a cyclic graph. (That is, for example, a subset such as "(A, B), (B, A)" or "(A, B), (B, C), (C, A)" should not be included). Further, in a case where a scale free network characteristic (which represents that a degree distribution of nodes is suitable for a power law) is expected by a prior knowledge, it may be considered that such a restriction condition is provided.

(3) An evaluation function S(D, G) is prepared. This is obtained by quantifying how much the graph G can explain the RNA expressed matrix data D. For example, in the above-mentioned g1, with respect to a control relationship of "gene A to gene B", "whether or not x(m, B)=F(x(m, A)) is satisfied" is quantified. F represents a model function of a control relationship, and as the quantification, for example, a penal provisions maximum likelihood (Akaike's Information Criterion (AIC) or Bayesian Information Criterion (BIC)) may be used.

(4) The graph G considered to be optimal is acquired using any heuristic model for solving an optimization problem, and an evaluation value S with respect to the graph G is acquired.

The above description is an example of estimation of a gene control network, in which points are as follows: That is, (a) on the basis of any RNA expressed matrix data D, (b) the set G based on the restriction condition C is considered, (c) maximization (or minimization) of the evaluation function S is tried, and thus, (d) a specific set G_1 is acquired, which is a general structure in a combinatorial optimization problem.

Accordingly, the invention may also be applied to various other combinatorial optimization problems. Further, the invention may also be applied to fields other than a so-called bioinformatics. For example, estimation of a gene control network is generalized as a Bayesian network, and thus, may also be used as a method for measuring various characteristics of multiple products into data and estimating a cause and effect relationship between the characteristics. As the combinatorial optimization problem, for example, a knapsack problem, a traveling salesman problem, or the like is known, which may be applied to various fields, and may be applied to any other fields.

A method for assigning a solution of the present problem will be described with reference to FIG. 2.

(1) A suitable initial solution (a first solution candidate) G_0 is given as at least one solution among solutions that belong to a solution space (search space) of a combinatorial optimization problem. For example, in the network estimation problem, an empty graph G_0={ } is set as an initial solution. Further, a current solution (first solution candidate) is represented as G_x. An initial first solution candidate G_x is the initial solution G_0 (G_x=G_0).

(2) Solution candidate groups GN_set={GN_1, GN_2, . . . , and GN_n} of which the degree of divergence N from the first solution candidate G_x is equal to or smaller than (a first range N_1) are enumerated. Here, the degree of divergence may be defined by a hamming distance between sets, for example. The degree of divergence N is a suitable predetermined value that is equal to or greater 1 and is equal to or smaller than a maximum degree of divergence capable of being enumerated and indexed as a binary decision diagram. Most simply, the degree of divergence N may be 1. Alternatively, the size of the degree of divergence N may be changed for each repetition. For example, the degree of divergence N may be given a large value for the first time, and then, may be gradually updated into a small value for each repetition.

(3) The evaluation value S (referred to as a "score") is given to each solution candidate group, and a best solution candidate (second solution candidate) GN_best is selected from the first solution candidate G_x and the solution candidate groups. The evaluation values S are generally given to all the solution candidate groups, but there is a case where total evaluation is difficult with respect to a large degree of divergence N. In such a case, a number T to be evaluable is extracted, and the best solution candidate is selected from the number T.

(4) In a case where a certain termination condition is satisfied, an optimal solution at that time is output as the optimal solution (first optimal solution) G_1=GN_best. In other cases, the first solution candidate G_x is updated into the best solution candidate (second solution candidate) GN_best within the degree of divergence N, and then, the procedure returns to the above-mentioned (1) (as G_x=GN_best).

Figure 2:
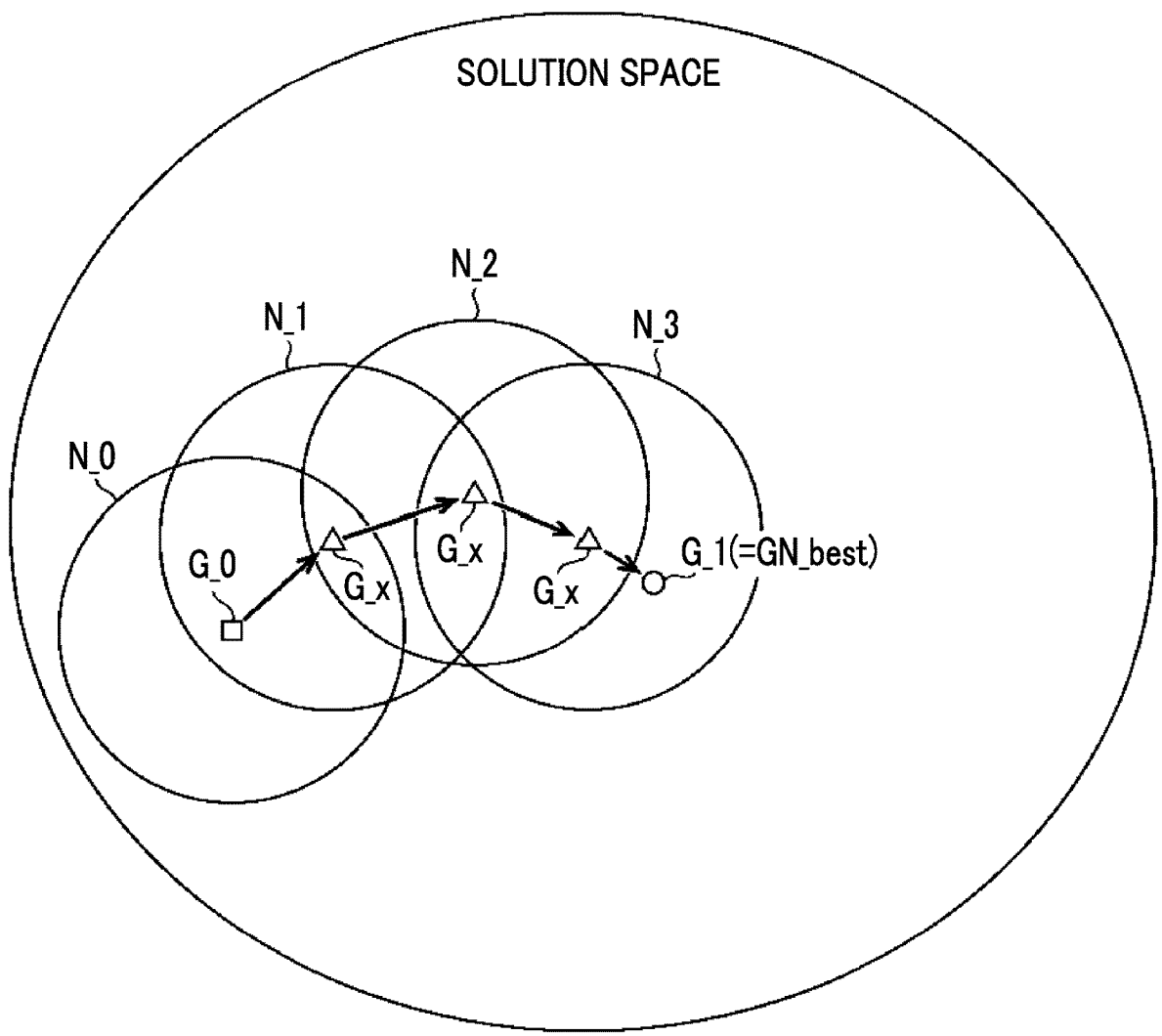
FIG. 2 is a conceptual diagram showing an order of search for an optimal solution.

In FIG. 2, N_0, N_1, N_2, and N_3 represent search ranges in which the degrees of divergence from the initial solution G_0 and the first solution candidate G_x are respectively within N.

As an algorithm based on the above-mentioned procedure, a greedy hill climbing method is known. In such heuristic search, searched solutions easily fall in localized solutions, and particularly, it is known that in a case where a small value is given to the degree of divergence N, searched solutions easily fall in localized solutions.

Figure 3:
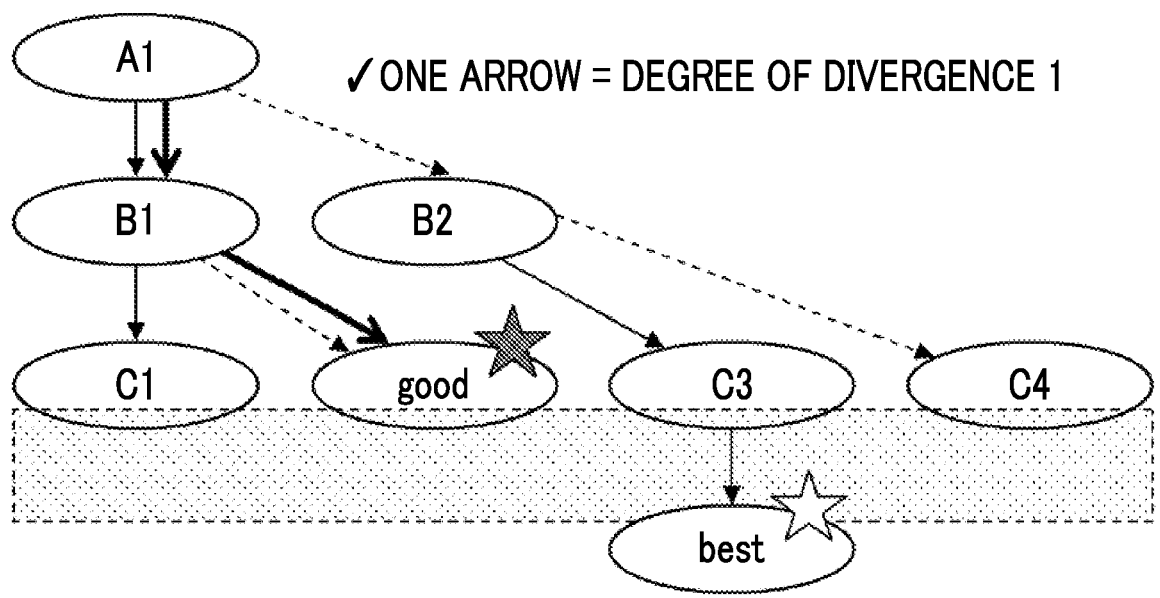
FIG. 3 is a diagram used for explaining a problem that a localized solution is selected in a search algorithm with a shallow depth.

As shown in FIG. 3, in the case of a search algorithm in which the degree of divergence is small (the depth is shallow), a search range in a depth direction is limited, and thus, the search is terminated in the middle, which leads to short-sighted selection of localized solutions. Such a phenomenon of falling in localized solutions is referred to as a "horizon effect". In FIG. 3, one arrow between nodes represents a degree of divergence 1.

On the other hand, in order to construct a search method with a wide field of view, such as a view covering the end of the horizontal line, it is necessary to search an optimal solution from solution candidate groups that fall within a large degree of divergence N over a predetermined degree.

However, in a case where a large value is given to the degree of divergence N, searched solutions do not easily fall in localized solutions, but the number of solution candidates becomes excessively large, which leads to difficulties in search for an optimal solution.

For example, in the Bayesian network in which a cyclic graph is not accepted in a network search problem, for example, in a case where the degree of divergence is defined at a hamming distance, at least N=2 is necessary for inverting directions of edges (*<(A, B), (B, A)>=<1, 0>→<(A, B), (B, A)>=<0, 1>). Accordingly, in a case where a graph in which edges of K=5 are inverted is to fall in a search range, it is necessary to satisfy N≥2K, and it is necessary to satisfy K=5 to N=10, for example.

It is difficult to enumerate (enumerate the solution candidate groups GN_set shown in the above-mentioned procedure (2)) solution candidates with a large degree of divergence from the first solution candidate while excluding obviously improper solutions (impossible solutions), and thus, there is a case where the degree of divergence N should be frequently set as a sufficiently small value.

For example, Table 1 shown below refers to a table indicating the number of solution candidates corresponding to the degree of divergence N (2 to 10) with respect to a suitable network in which the number of nodes is 26.

TABLE 1

| Degree of divergence (N) | Number of candidate solutions |
|---|---|
| 2 | 2,155 |
| 3 | 48,314 |
| 4 | 825,752 |
| 5 | 10,675,065 |
| 6 | 113,551,710 |
| 7 | 1,022,221,826 |
| 8 | 7,949,911,133 |
| 9 | 54,257,098,752 |
| 10 | 328,991,302,916 |

As shown in Table 1, it can be understood that as the degree of divergence N becomes large, the number of solution candidates increases exponentially. This becomes even more noticeable as the network scale increases.

Accordingly, the invention uses a binary search tree. The binary search tree is a zero-suppressed binary decision diagram (ZDD), for example, and also serves as means for equally extracting solutions. Using the ZDD, it is possible to efficiently count even an extremely large number of combinations. In reality, Table 1 is obtained by counting the number of solution candidates using the ZDD.

The binary search tree includes both of "I. means for identifying whether to decide, using a part of combinations, solutions to be unsuitable without consideration of the remaining combinations to reduce patterns to be identified" and "II. means for extracting a common portion of pattern groups in which a difference is present in only a part of combinations and sharing remaining identification processes to reduce patterns to be identified".

The binary search tree is not limited to the ZDD, and may employ a modified data structure similar to the ZDD, such as a BDD (binary decision diagram) or a πDD (permutation decision diagram).

Here, in determination of "I. whether the unsuitability is present or not", the restriction condition C may be used.

For example, in the case of a gene control network, in a case where cycling is already generated by employed edges, it is decided whether the unsuitability is present even without consideration of remaining edges. In determination of "II. whether the common portion is present or not", similarly, it is determined whether the common portion is obtainable in consideration of a considered portion among patterns and the remaining portion on the basis of the restriction condition C. For example, in a case where only the number of edges is considered, and in a case where the number of employed edges is the same, the rule II may be employed. Since an algorithm is known as a frontier model in the case of the ZDD, the processes may follow this algorithm.

As a method that includes only the rule I, a method for enumerating solutions by a branch and bound method may be used. It is possible to perform enumeration based on the branch and bound method by negating the rule II in the ZDD. Alternatively, negation of the rule I may also be considered. However, it is preferable to use both of the rules I and II as in the ZDD, and thus, it is possible to efficiently enumerate solutions.

As a method for generating solutions with respect to a large degree of divergence N, for example, random generation may also be considered.

Further, in the heuristic search in the related art, for example, a method for adding, with respect to a small degree of divergence N such as a degree of divergence N=1, random numbers or the like to a penal provisions maximum likelihood of scores S, so that a progressing direction is not necessarily an optimal direction in a stochastic manner, or the like, has also been proposed. Further, there is also a method for selecting a next solution candidate according to a probability based on scores S. These methods aim at an effect for searching for a wider range in a solution space to so as not to easily fall in localized solutions. However, finally, the influence of scores of solution candidates themselves in a range of N=1 becomes large, and thus, the expected effect is not necessarily be obtained. According to the invention, since it is possible to efficiently search solution candidates in an actually wide range of the degree of divergence N, it is possible to expect a fundamental solution.

Further, a case where the number of solutions in a range of the degree of divergence N extremely large and thus the solutions cannot be evaluated may be considered. In such case, similarly, by using the binary search tree such as the ZDD proposed in the invention, it is possible to equally extract solutions of an evaluable number, and thus, it is possible to search an enlarged solution space in a stochastically equivalent manner. Here, a method for combining the above-described study with respect to a large degree of divergence N according to the invention may be used.

<Optimal Solution Search Apparatus>

[Apparatus Configuration]

Figure 4:
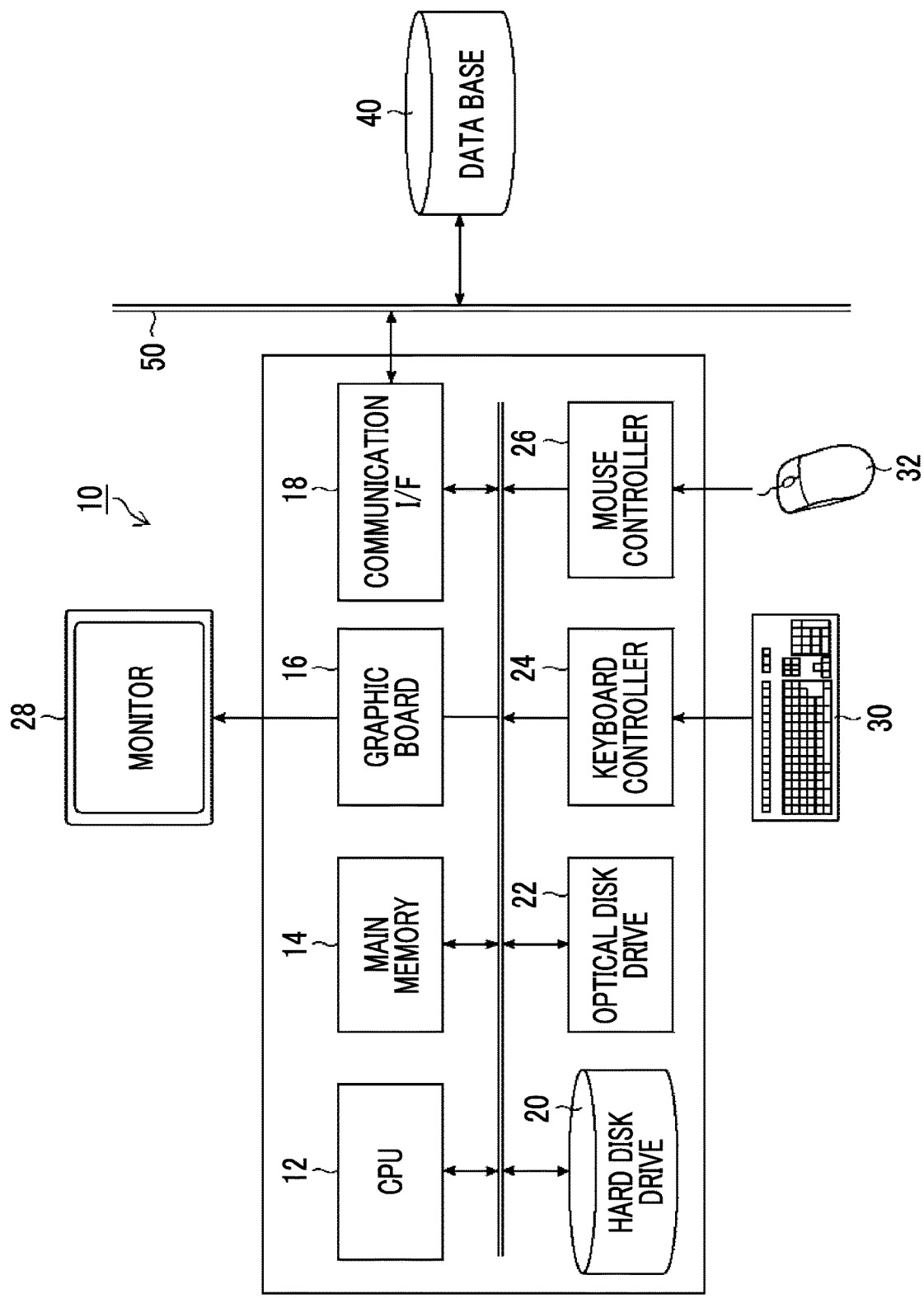
FIG. 4 is a block diagram showing a hardware configuration of an optimal solution search apparatus according to the invention.

FIG. 4 is a block diagram showing a hardware configuration of the optimal solution search apparatus according to the invention.

An optimal solution search apparatus 10 shown in FIG. 3 is formed by a computer, and includes a central processing unit (CPU) 12 that mainly controls operations of respective components, a main memory 14 in which a control program of the apparatus is stored and that becomes a working area when the program is executed, a graphic board 16 that controls display of a monitor device 28 such as a liquid crystal display or a CRT display, a communication interface (communication I/F) 18 that is connected to a network 50, a hard disk drive 20 that stores a variety of application software including an optimal solution search program according to the invention, optimal solutions (which will be described later), and the like, an optical disc drive 22 that performs reading and writing of a variety of data and programs recorded on an optical disc, a keyboard controller 24 that detects a key operation of a keyboard 30 and outputs the result to the CPU 12 as an instruction input, and a mouse controller 26 that detects a state of a mouse 32 that is a position input device and outputs a signal of a position of a mouse pointer on a monitor device 28, a state of the mouse 32, or the like to the CPU 12.

Further, a database 40 that stores RNA expressed matrix data is connected to the network 50. The RNA expressed matrix data is numerical value matrix data indicating the level of RNA expression of a plurality of genes (A, B, . . . , Z) in a plurality of cell lines (samples: X1, X2, . . . , Xn) as shown in FIG. 1. Further, the level of RNA expression is acquired from samples by a next generation sequencer (NGS) (not shown), or the like.

The optimal solution search apparatus 10 is able to access the database 40 through the communication I/F 18 to acquire necessary RNA expressed matrix data. As the RNA expressed matrix data, RNA expressed matrix data that is stored in the external database 40 may be used. Alternatively, RNA expressed matrix data may be stored in the hard disk drive 20, and the RNA expressed matrix data stored in the hard disk drive 20 may be used.

EMBODIMENTS

Figure 5:
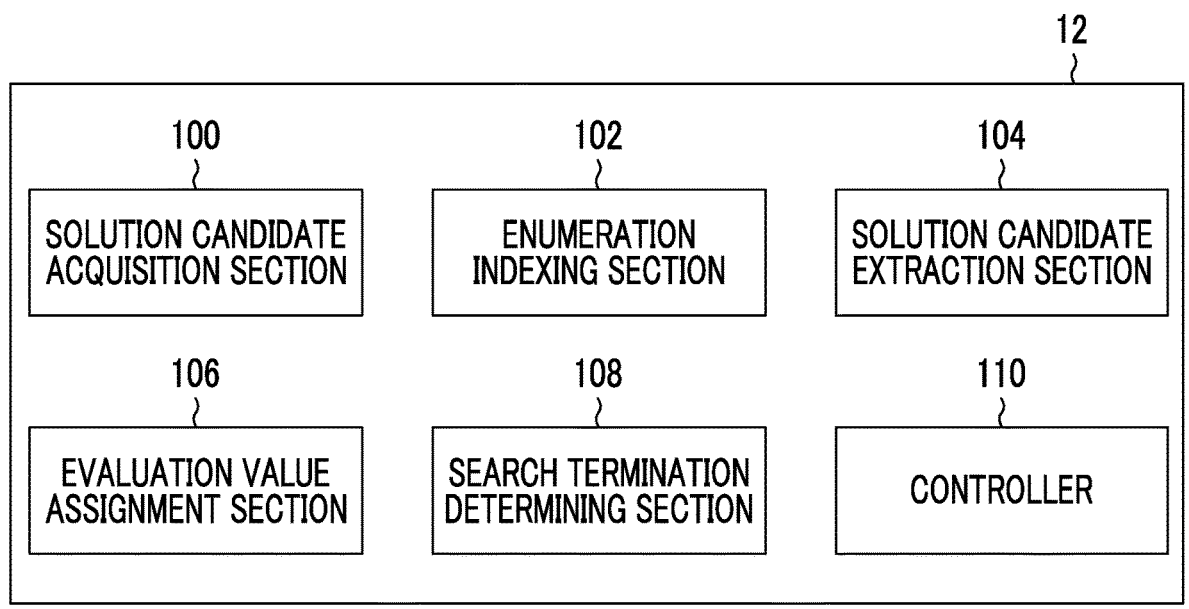
FIG. 5 is a functional block diagram showing functions of the optimal solution search apparatus shown in FIG. 4.

FIG. 5 is a functional block diagram showing functions of the CPU 12 of the optimal solution search apparatus 10 shown in FIG. 4.

The CPU 12 functions as a variety of processing sections by executing the optimal solution search program stored in the hard disk drive 20, and includes a solution candidate acquisition section 100, an enumeration indexing section 102, a solution candidate extraction section 104, an evaluation value assignment section 106, a search termination determining section 108, and a controller 110.

The solution candidate acquisition section 100 acquires an initial solution (first solution candidate) G_0 that is suitable as at least one solution among solutions that belong to a solution space (mining space) of a combinatorial optimization problem. For example, in a network estimation problem, an empty graph G_0={ } may be set as an initial solution. Further, a current solution is acquired as a first solution candidate G_x.

The acquisition of the first solution candidate G_x will be described in detail hereinafter. Further, the initial first solution candidate G_x uses the initial solution G_0 (G_x=G_0).

The enumeration indexing section 102 is a section that enumerates and indexes solution candidate groups GN_set that fall within the degree of divergence N from the first solution candidate G_x (in which initial first solution candidate G_x is the initial solution G_0) as a binary decision diagram, and in this example, enumerates and indexes the solution candidate groups GN_set on the basis of a path enumeration indexing algorithm using the ZDD. Here, the solution candidate groups GN_set correspond to solutions within a search range (respective search ranges indicated by N_0, N_1, N_2, N_3, and the like shown in FIG. 2) of the first solution candidate (the initial solution G_0 or the current first solution candidate G_x).

By constructing the ZDD under the restriction condition C, it is possible to equally extract a total number of the solution candidate groups GN_set and certain elements of the set {G}. In a gene control network, a graph in which genes are nodes and a control relationship is an edge may be considered.

The "solution" means an "allowable solution (executable solution)", which is not limited to an optimal solution but represents a solution that is not non-executable. That is, improper solutions (of which execution is not possible) are excluded in advance.

Further, the enumeration indexing section 102 contracts combinable patterns in a combinatorial optimization problem using at least one of "tree pruning" or "node sharing" to form a data structure to be enumerated and indexed. Here, the "tree pruning" refers to a process of identifying whether to decide, on the basis of a part of combinations among combinable patterns in a combinatorial optimization problem, solutions to be unsuitable without consideration of the remaining combinations to reduce patterns to be identified. Further, the "node sharing" in the frontier model refers to a process of extracting a common portion of pattern groups in which a difference is present at only a part of combinations among combinable patterns, and sharing the remaining combinations to reduce patterns to be identified.

Further, the restriction condition C is used for determination of "whether the unsuitability is present" in the "tree pruning". For example, in the case of a gene control network, in a case where a cycle already occurs by employed edges, it is decided that the unsuitability is present even without consideration of the remaining edges. Further, in determination of "whether the common portion is present" in the "node sharing", similarly, it is determined that whether the commonization is possible in consideration of a considered portion among patterns and the remaining portion on the basis of the restriction condition C. For example, in a case where only the number of edges is considered, and in a case where the number of employed edges is the same, the "node sharing" may be employed. Since algorithms of the "tree pruning" and the "node sharing" are known as frontier models in the case of the ZDD, the processes may follow these algorithms.

As a method that includes only the "tree pruning", a method for enumerating solutions by a branch and bound method may be used. It is possible to perform enumeration based on the branch and bound method by negating the "node sharing" in the ZDD. Alternatively, negation of the "tree pruning" may also be considered. However, it is preferable to use both of the "tree pruning" and the "node sharing" as in the ZDD, and thus, it is possible to efficiently enumerate solutions.

<Outline of ZDD>

Next, the ZDD and a frontier model will be described in detail.

First, application of the ZDD to a set partitioning problem that is a kind of a combinatorial optimization problem will be described.

The set partitioning problem refers to a problem of whether to select, when processions of subsets with respect to a certain whole set are given, some of them to create patterns (combinations) such as "there is no repetition in the selected subsets (mutually exclusive)" and "the original whole set is covered (overall coverage)".

Figure 6:
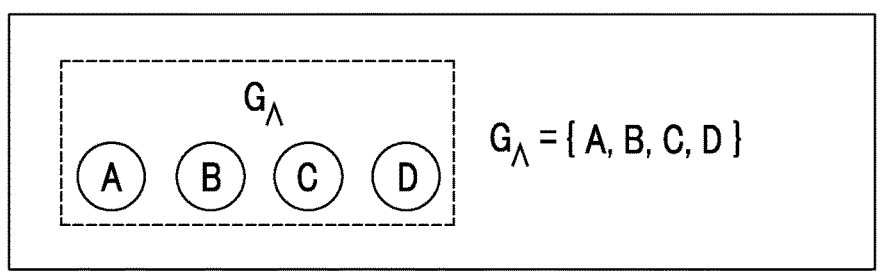
FIG. 6 is a diagram showing a whole set "G$\wedge$" that includes elements "A, B, C, and D".

The set is defined as a "collection of elements". As shown in FIG. 6, "G/∧" represents a whole set, and "A, B, C, and D" correspond to "elements".

Figure 7:
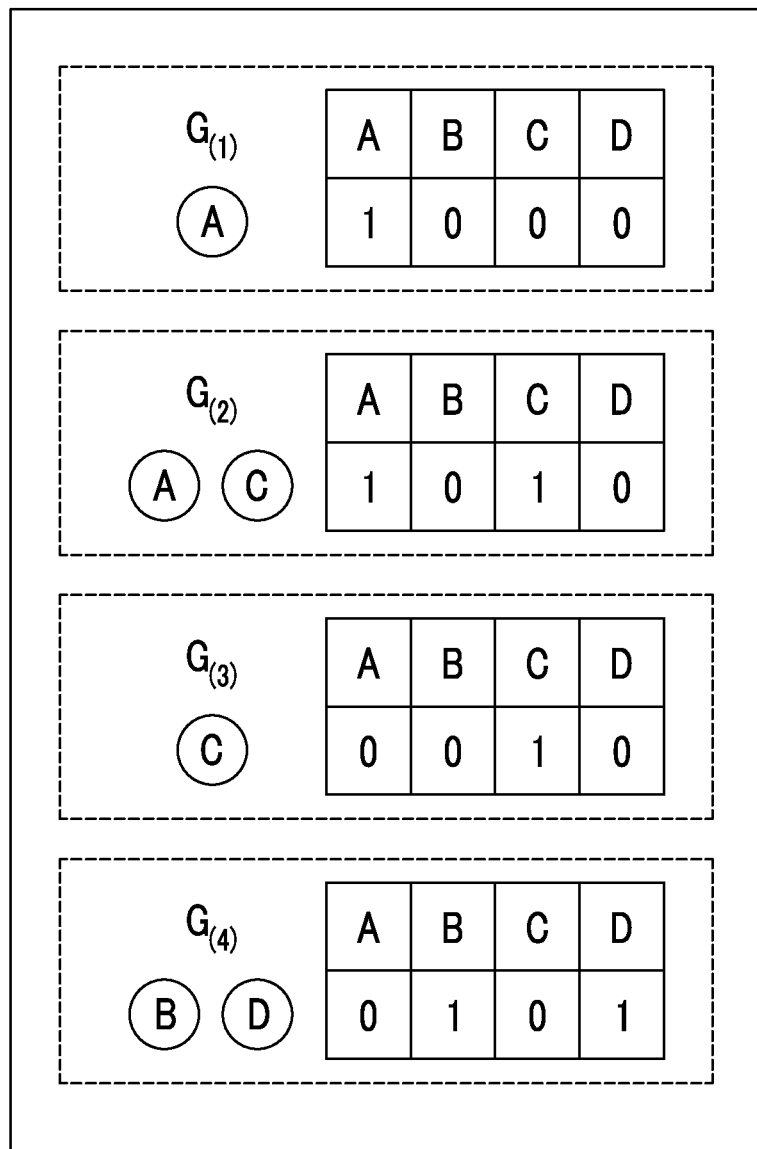
FIG. 7 is a diagram showing four subsets ($G_{(1)}$, $G_{(2)}$, $G_{(3)}$, $G_{(4)}$).

In a case where elements are fixed and the presence or absence of an element is allocated "1 or 0", for example, as shown in FIG. 7, subsets are determined.

Figure 8:
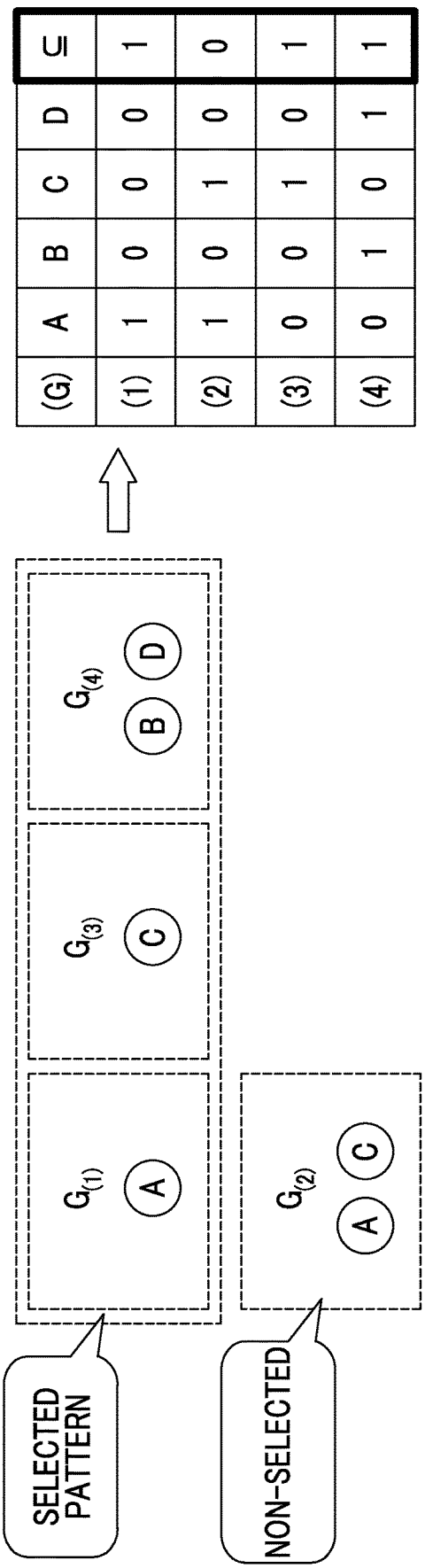
FIG. 8 is a diagram showing "patterns" corresponding to selection of three subsets ($G_{(1)}$, $G_{(2)}$, $G_{(3)}$).

In a case where "whether or not subsets are included" is encoded, "patterns" may be expressed as shown in FIG. 8.

In an example shown in FIG. 8, In an example shown in FIG. 8, "patterns" corresponding to selection of three subsets ($G_{(1)}$, $G_{(3)}$, $G_{(4)}$) are shown.

Subsequently, it is determined "whether conditions (coatability and exclusiveness) are satisfied" for each pattern.

FIG. 9 shows three examples of "patterns" corresponding to selection of subsets and determination results indicating whether the respective "patterns" satisfy the conditions.

As shown in FIG. 9, a "pattern" corresponding to selection of a subset ($G_{(1)}$, $G_{(3)}$, $G_{(4)}$) satisfies the conditions, and "patterns" corresponding to selection of a subset ($G_{(2)}$, $G_{(3)}$, $G_{(4)}$) and a subset ($G_{(3)}$, $G_{(4)}$) do not satisfy the conditions.

This is because the subset ($G_{(2)}$, $G_{(3)}$, $G_{(4)}$) does not satisfy exclusiveness since the element "C" is repeated and the subset ($G_{(3)}$, $G_{(4)}$) does not satisfy coatability since the element "A" is lacking.

Figure 10:
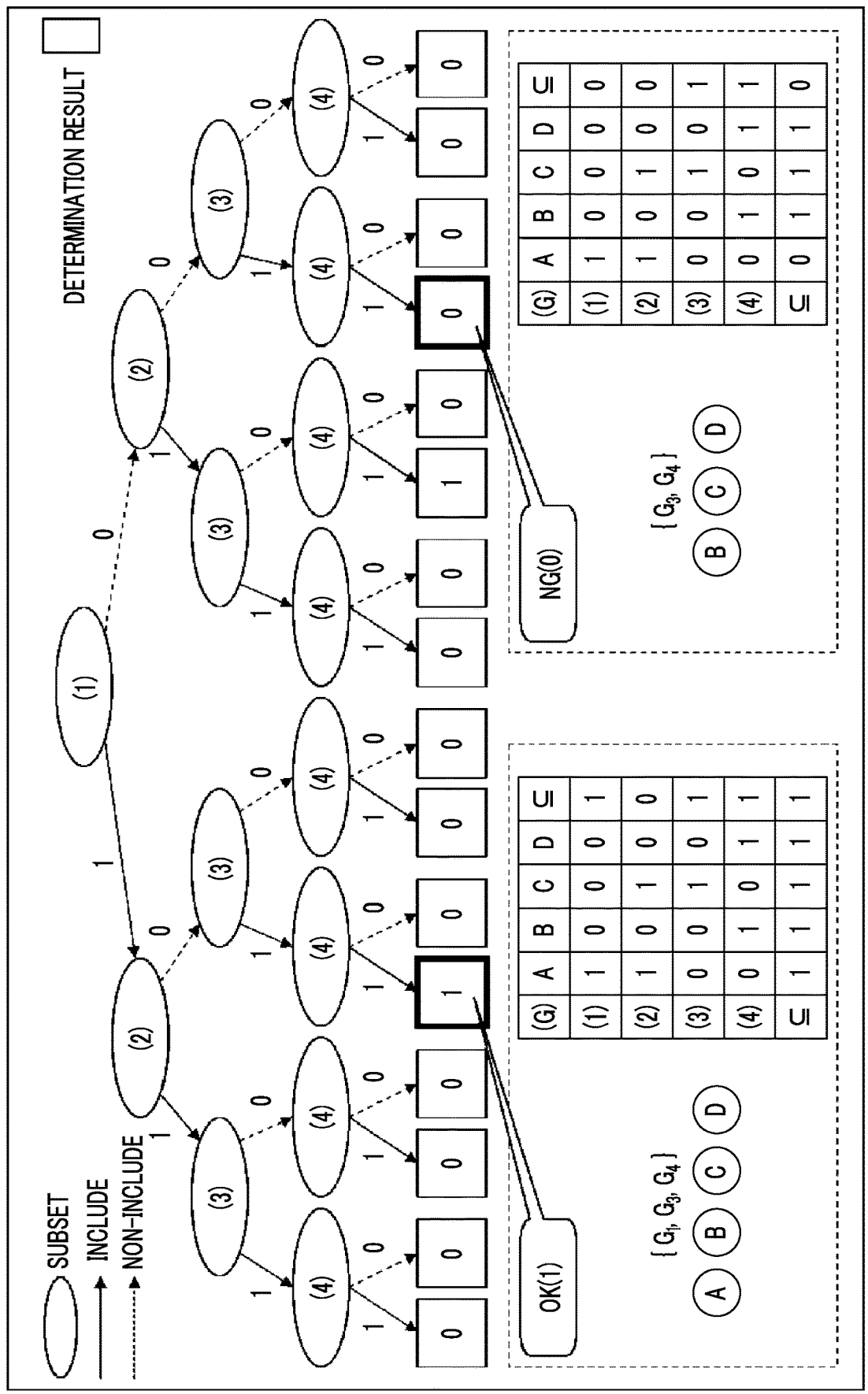
FIG. 10 is a diagram for comprehensively expressing all patterns and determination results in a set partitioning problem shown in FIGS. 6 to 9 using a "bipartite graph".

All the patterns and determination results in the set partitioning problem in this example may be comprehensively expressed by a "bipartite graph", as shown in FIG. 10.

Since the number of subsets in this example is only 4, but the number of all patterns is 16 ($=2^4$). In a case where the number of subsets is N, the number of all patterns becomes $2^N$. In the expression of "bipartite graph", there is a problem that branches and leaves increases as "a power of 2".

With respect to the combination problem, it is known that it is not possible to search an optimal solution in a finite time due to occurrence of "combination explosion", but it is possible to realize efficient (practical) "numeration" of combination sets that satisfy a predetermined condition using contraction techniques such as the "tree pruning" and the "node sharing" of the frontier model.

Figure 11:
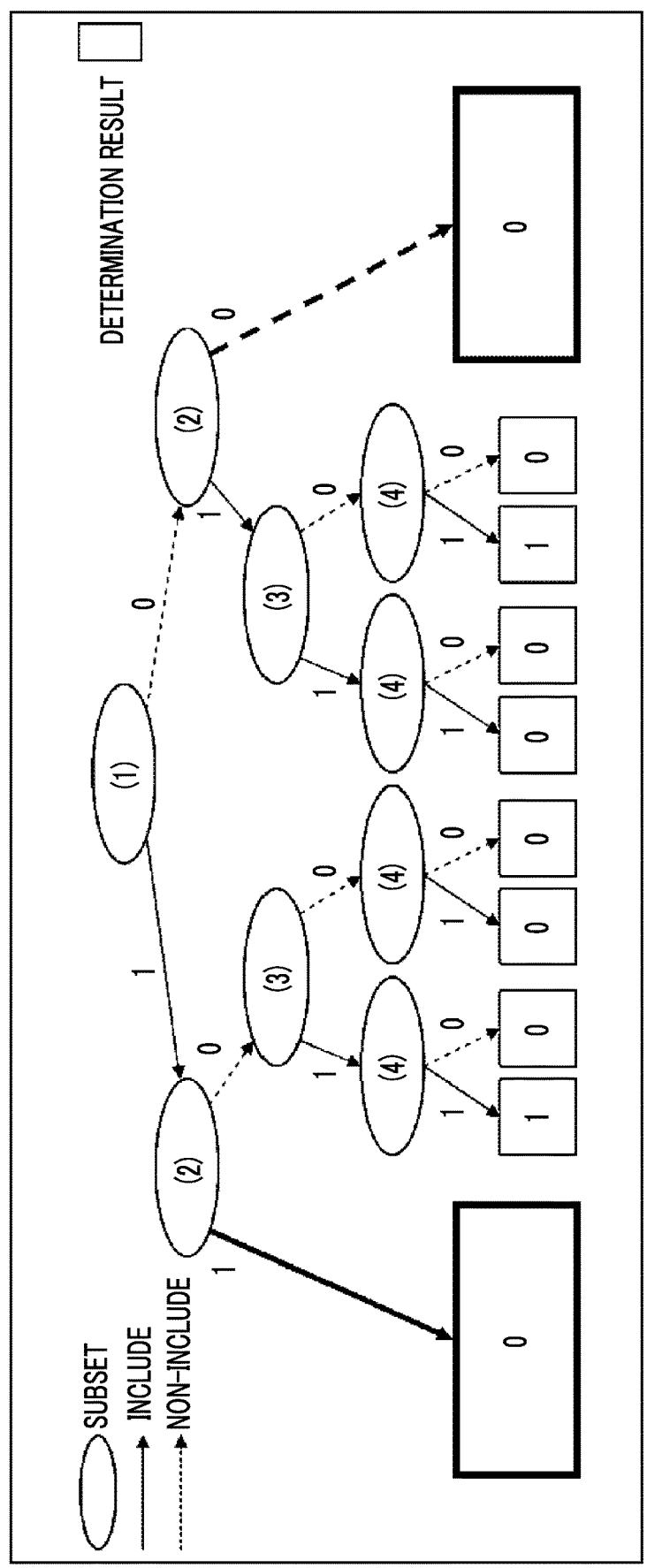
FIG. 11 is a diagram showing a form in which combinable patterns are contracted by "tree pruning" of a frontier model.

FIG. 11 is a diagram showing a form in which combinable patterns are contracted by the "tree pruning" of the frontier model.

In a case where subsets "$G_{(1)}$" and "$G_{(2)}$" are simultaneously selected as shown in FIG. 11, the element "A" is repeated, and it is decided that the unsuitability is present at that time point (regardless of subsequent selections). Similarly, in a case where both of the subsets "$G_{(1)}$" and "$G_{(2)}$" are not selected, the element "A" is omitted, and thus, it is decided that the unsuitability is present. Further, in a case where it is decided that the unsuitability is present, the expansion is terminated at that time point, which leads to "determination result=0".

In this way, the "tree pruning" tries, in a case where it is decided that the unsuitability is present in the middle of pattern selection, contraction of combinable patterns by terminating the expansion at that time point.

Figure 12:
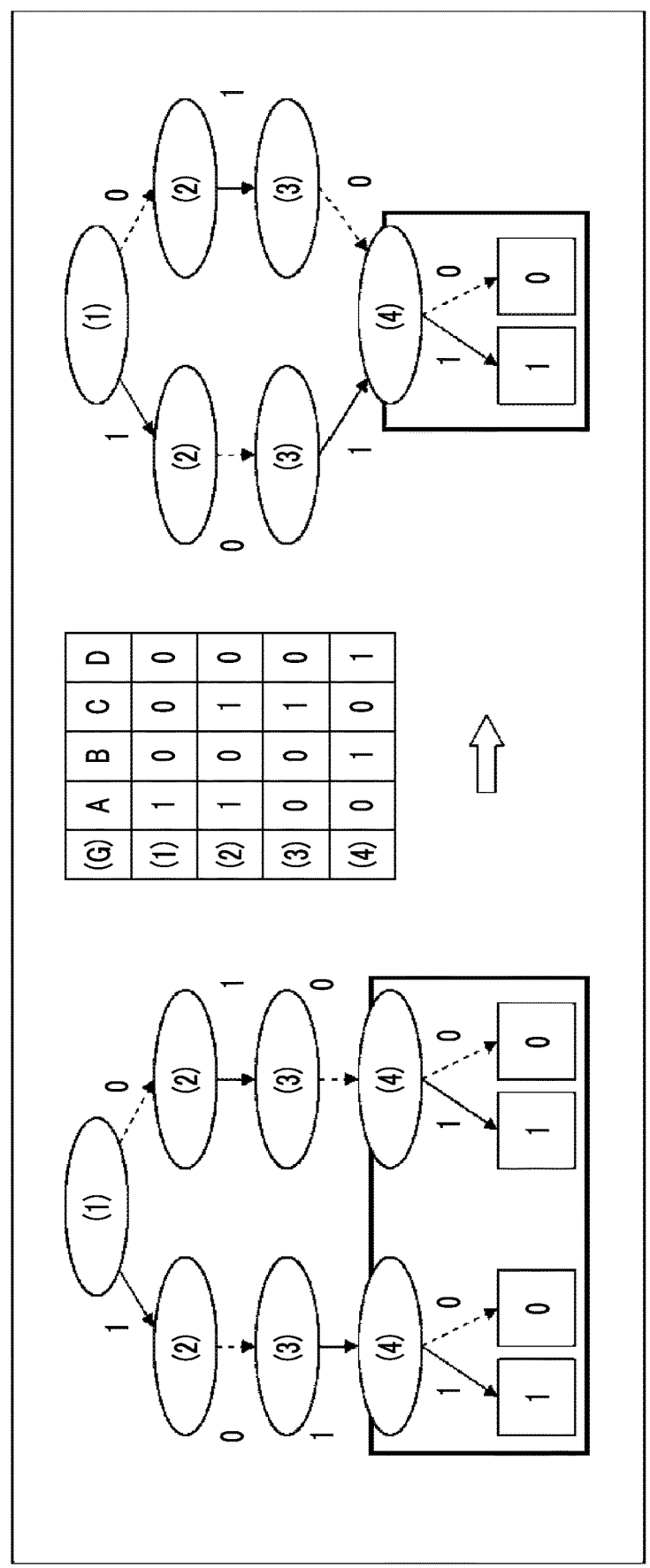
FIG. 12 is a diagram showing a form in which combinable patterns are contracted by "node sharing" of the frontier model.

FIG. 12 is a diagram showing a form in which combinable patterns are contracted (contracted) by the "node sharing" of the frontier model.

In both of a case where two subsets "$G_{(1)}$" and "$G_{(3)}$" are selected as shown in FIG. 12 and a case where one subset "$G_{(2)}$" is selected, since a condition that the "elements "A" and "B" are respectively included only once" and a condition that the "elements "A" and "B" are not included more than once" are satisfied, adoption judgments based on subsequent selections completely match each other.

Further, in this case, the expansion is not separately performed, but may be collectively handled. That is, the same "nodes" may be shared.

As described above, the "node sharing" aims at contraction of combinable patterns by collectively handling subsequent processes in a case where the subsequent processes of a plurality of pattern selections are the same.

Figure 13:
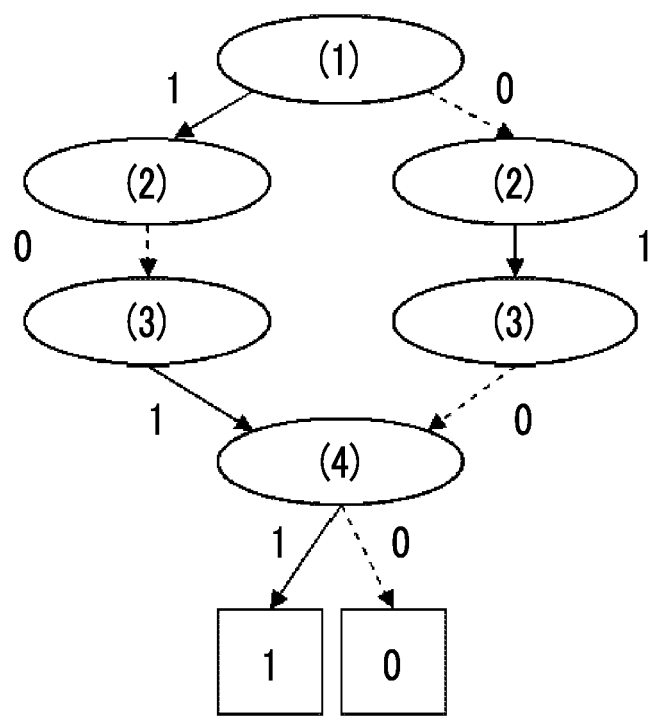
FIG. 13 is a diagram showing a result obtained by contracting the combinable patterns by the "tree pruning" and "node sharing" of the frontier model.

FIG. 13 is a diagram showing a result obtained by contracting combinable patterns by the "tree pruning" and the "node sharing" of the frontier model.

As shown in FIG. 13, it is possible to greatly reduce branches and leaves to be enlarged to 16 patterns (FIG. 10), and to acquire a decision result that completely matches a result in a case where the patterns are comprehensively determined one by one.

Figure 14:
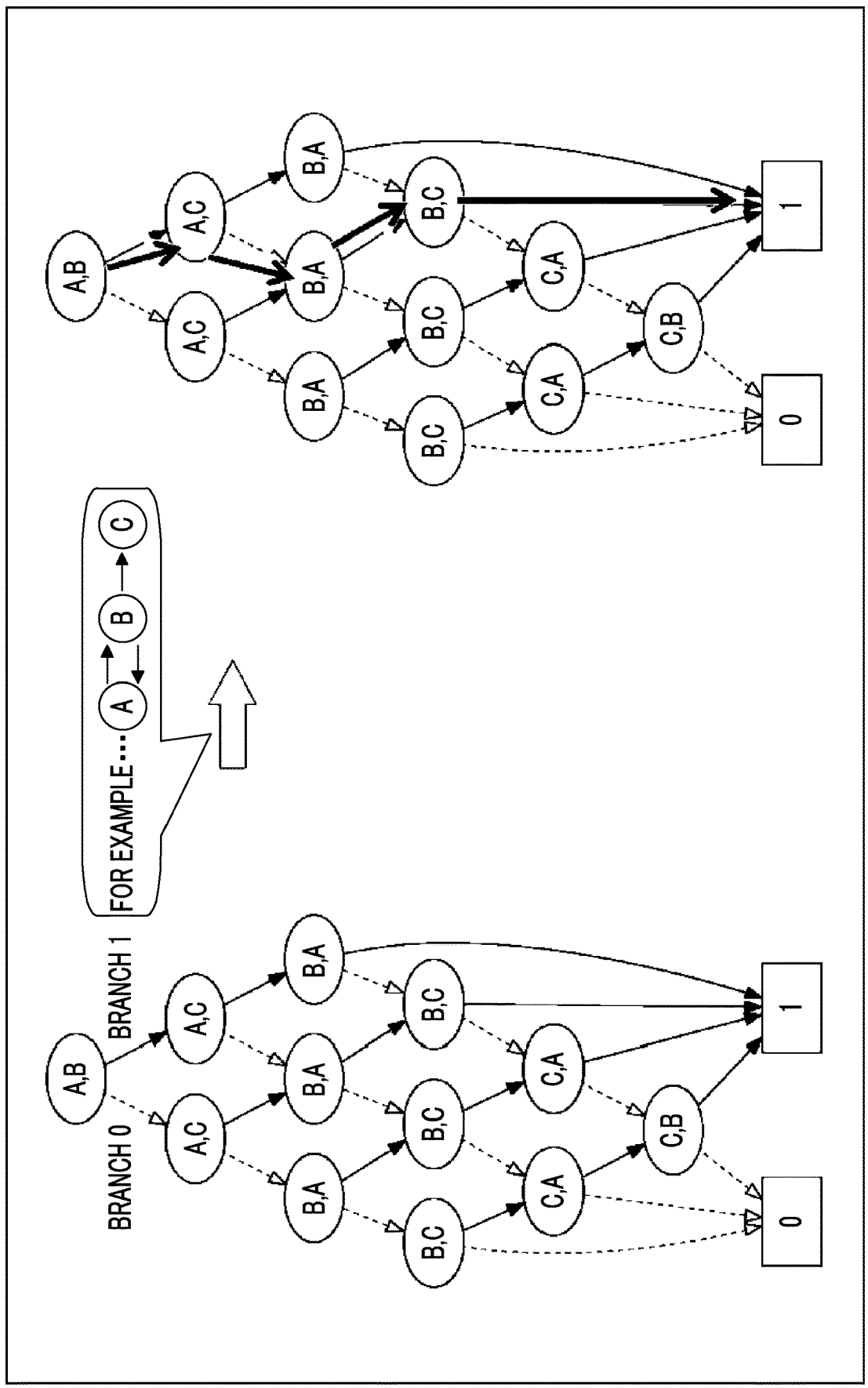
FIG. 14 is a diagram including a diagram in which in node={A, B, C}, a graph set of which the number of edges is 3 is expressed using a ZDD and a diagram showing a graph corresponding to a specific path (A$\leftrightarrow$B$\rightarrow$C).

FIG. 14 is a diagram in which nodes are {A, B, C} and a solution candidate group (a graph set) of which the number of edges is 3 is expressed using a ZDD.

In FIG. 14, only when passing through "1 branch" indicated by a solid line, a solution candidate including edges (in which "0 branch" indicated by a dotted line or a skipped edge is not included) is employed, and finally, if a solution candidate reaches "1 end", the solution candidate is employed. (Here, a solution candidate that reaches "0 end" is not employed.)

Here, for example, a solution candidate corresponding to a path of (A↔B→C) is expressed by a path indicated by a thick arrow on the right side of FIG. 14.

Figure 15:
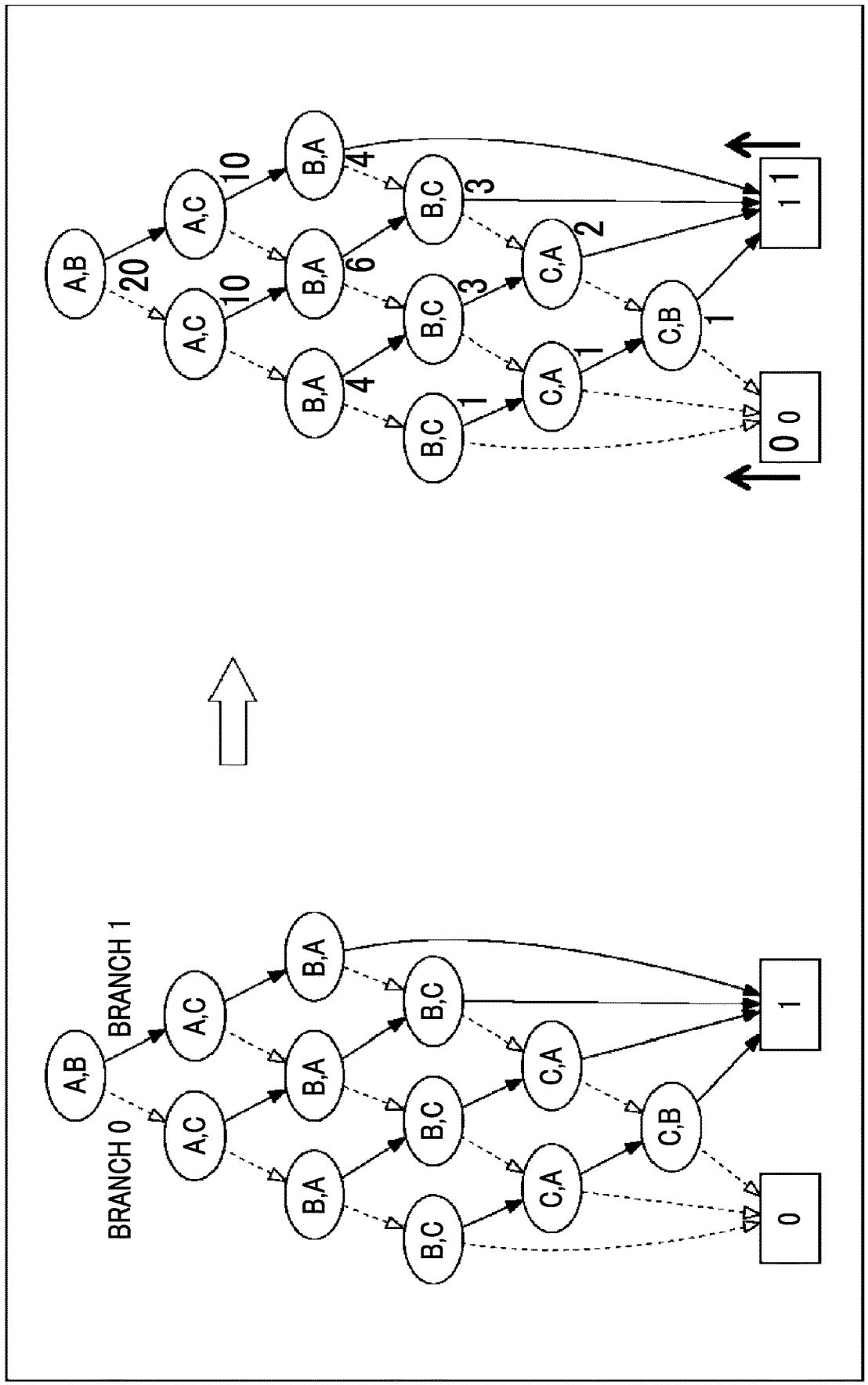
FIG. 15 is a diagram showing "numeration" of the number of entire graphs (a total employment number) in a graph set that is expressed using a ZDD.

FIG. 15 is a diagram showing "numeration" of the number of entire solution candidates (a total employment number).

As shown in FIG. 15, the total employment number may be calculated by assigning "1" to "1 end" indicating a determination result and numerating from "1 end" to a top-level ZDD node in a reverse order.

The numeration is performed by adding up numbers assigned to respective branch tips from lower-layer ZDD nodes to a higher-level ZDD node and assigning a number obtained by the addition to the higher-level ZDD node itself. This is repeated up to the top-level ZDD node, and a numerical value assigned to the top-level ZDD node becomes a total employment number (a total number of paths that reach "1 end"). In the case of this example, the total employment number is 20.

The "numeration" of calculating the total employment number in this way is one of important characteristics of the ZDD.

Figure 16:
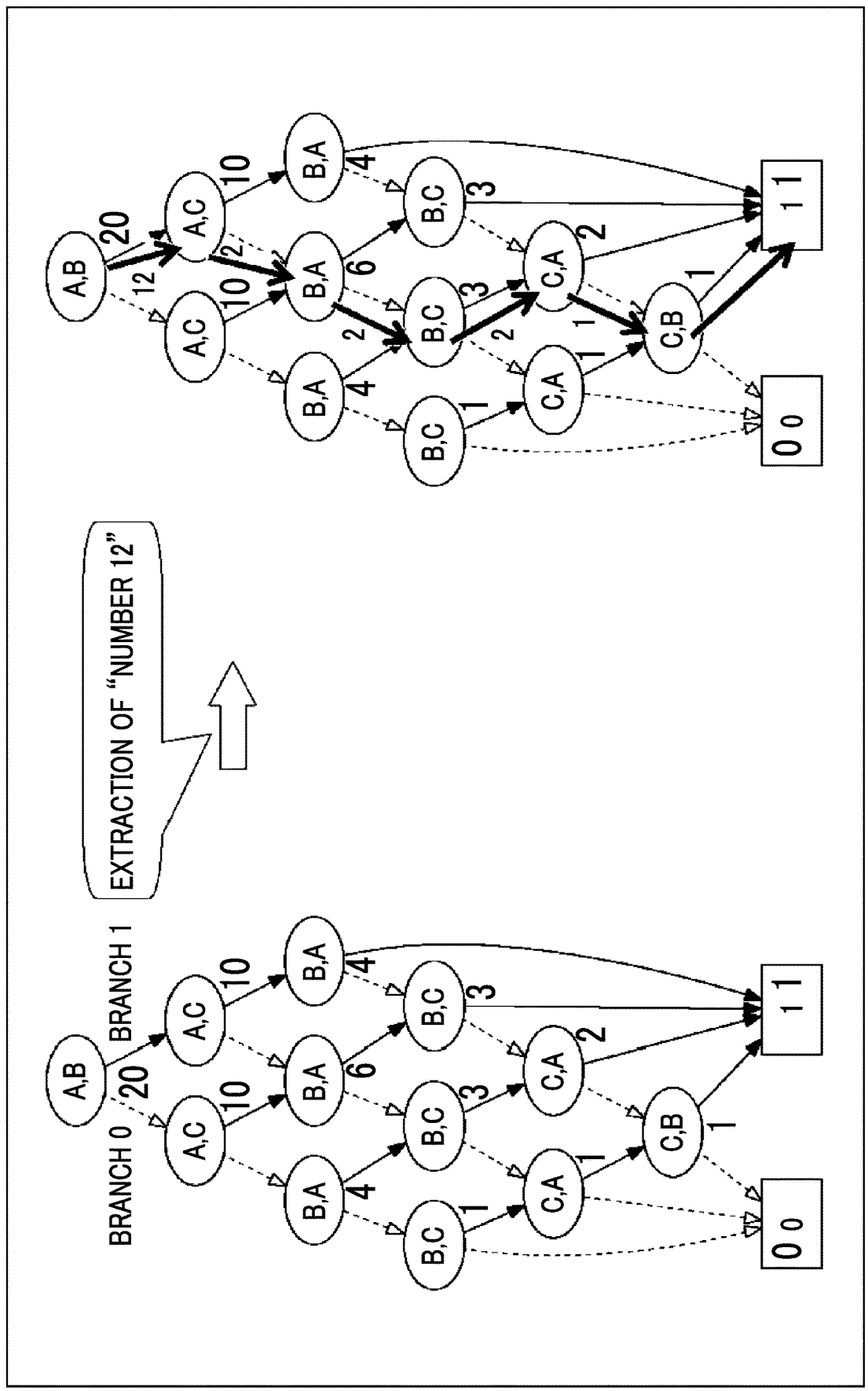
FIG. 16 is a diagram showing a method for extracting a graph of a certain designation number from a graph set that is expressed using a ZDD.

FIG. 16 is a diagram showing a method for extracting a solution candidate having a certain designation number.

In a case where a certain number (in the case of this example, a number within the range of 1 to 20) is designated, it is possible to extract a solution candidate corresponding to the designated number by going down from a root according to the designated number (designation number).

For example, in a case where a solution candidate of "number 12" is to be extracted, the procedure starts by going down from the top-level node according to a thick arrow in FIG. 16. First, the procedure proceeds to a branch including a designation number among "branch 0" or "branch 1" from the top-level node (A, B). In this example, the procedure proceeds to a branch on the side of "branch 1" to go down from the top-level node (A, B) to a lower-layer node (A, C) (right-side nodes (A, C) in FIG. 14). In a case where the procedure proceeds to the branch on the side of "branch 1", a number on the side of "branch 0" is subtracted from the designation number. In this example, since the solution candidate of "number 12" is to be extracted, a number "10" on the side of "branch 0" is subtracted from the designation number "12", and the result becomes "2". By repeating this process until reaching "1 end", it is possible to extract a path (solution candidate) indicated by the thick arrow in FIG. 16. The solution candidate of "number 12" shown in FIG. 16 is a solution candidate corresponding to a path of (A→B↔C).

After the "numeration" of the total employment number in this way, the solution candidate acquisition section 100 can extract, in a case where a certain number within the total employment number is designated, a solution candidate that is uniquely specified by the designated number. Thus, by generating random numbers that are equal to or smaller than the total employment number, it is possible to "equal extraction" solution candidates on a search range in which the degree of divergence is within N from a solution space (initial solution G_0 or current first solution candidate G_x). The "equal extraction" of solutions in a solution space is one of important characteristics of the ZDD.

Returning to FIG. 5, the solution candidate extraction section 104 is a section that equally extracting solutions (second solution candidates G) in a solution space of a combinatorial optimization problem (gene control network) in cooperation with the enumeration indexing section 102. In this example, the solution candidate extraction section 104 equally extracts a part or the entirety of the solution candidate groups GN_set as the second solution candidates G from the solution candidate groups GN_set={GN_1, GN_2, . . . , GN_n} that are enumerated and indexed by the enumeration indexing section 102, which fall within the degree of divergence N (first range) or smaller from the first solution candidate G_x.

As means for equally extracting the second solution candidates G with respect to a large degree of divergence N, for example, random generation may be considered. That is, solution candidates are randomly generated (in which the presence or absence of edges in a graph are determined by random numbers), and in a case where a restriction of G is not satisfied, regeneration is repeated. However, in the random generation, there is a possibility that solution candidates that are the same as already generated solution candidates may be generated. Accordingly, in this method, in a case where a large degree of divergence N is given, expectable solution candidates becomes extremely large, and thus, unless all solution candidates are comprehended, or unless the number of solutions to be extracted therefrom is set to be large, sufficient search may not be achieved. In such a case, in the random generation, in a case where the number of extracted solutions is not large, a probability that the same solution candidates are generated becomes large. Accordingly, the effect of introduction of the ZDD capable of enumerating and indexing solutions is large.

Further, particularly, as in a case where a cyclic graph is to be prohibited in a network search problem, for example, there is a case where it is difficult to give a restriction in simple and random generation. Particularly, in a method for repeating determination and regeneration, in a case where a solution space under the restriction is smaller than a solution space covered by random generation, for example, in a case where the size of the solution space is set to 1:K, since average K random generations are required for generating one solution, efficiency is poor. In the generation method based on random numbers, it is assumed that K becomes large. Accordingly, in a case where solution search is performed while a restriction condition is imposed, the introduction of the ZDD can make it possible to expect a larger effect.

Further, the above-described restriction condition may be set in any combination problem, but particularly, in the network search problem, since various restrictions such as securing of a scale-free property focused on orders, limited to spanning trees (forest or woods) or the like, in addition to prohibition of a cyclic graph, may be considered, the invention is particularly preferable.

The evaluation value assignment section 106 assigns evaluation values to the equally extracted second solution candidates G by the solution candidate extraction section 104. For example, an evaluation function S(D, G) obtained by quantifying how much the second solution candidates G can explain the RNA expressed matrix data D is prepared, and then, the evaluation value assignment section 106 acquires evaluation values S corresponding to the equally extracted second solution candidates G on the basis of the evaluation function S(D, G), and assigns the acquired evaluation values S to the second solution candidates G. The evaluation function S(D, G) may be created by the evaluation value assignment section 106 on the basis of RNA expressed matrix data stored in the database 40, or may be created on the basis of RNA expressed matrix data in advance. For example, the evaluation function S(D, G) may employ an evaluation function S(D, G) stored in the database 40.

The search termination determining section 108 determines whether search for an optimal solution (first optimal solution) is terminated on the basis of an evaluation value S(G_x) of a current first solution candidate G_x acquired by the solution candidate acquisition section 100 and an evaluation value S(GN_best) of a second solution candidate GN_best that is the best second solution candidate G selected from the second solution candidates G. Here, the following methods may be considered as the determination of whether the search is terminated, for example.

(1) G_x=GN_best (a solution is not updated)
(2) S(GN_best)−S(G_x)<ΔS (the degree of improvement of the evaluation value becomes small)
(3) The number of repetitions reaches a predetermined number The controller 110 is a section that generally controls the respective processing sections of the solution candidate acquisition section 100, the enumeration indexing section 102, the solution candidate extraction section 104, the evaluation value assignment section 106, and the search termination determining section 108. In a case where the search termination determining section 108 does not determine that the search is terminated, the controller 110 updates the current first solution candidate G_x to the second solution candidate GN_best (G_x=GN_best). The solution candidate acquisition section 100 acquires the updated new first solution candidate G_x and its evaluation value S(G_x) (=S(GN_best)).

Further, the controller 110 repeatedly executes the respective processing sections of the enumeration indexing section 102, the solution candidate extraction section 104, the evaluation value assignment section 106, and the search termination determining section 108, on the basis of the updated new first solution candidate G_x.

On the other hand, in a case where the search termination determining section 108 determines that the search is terminated, the controller 110 outputs the current first solution candidate G_x as an optimal solution (first optimal solution) G_1 (=GN_best).

[Determination of Second Solution Candidate GN_Best]

Although it is possible to extract the best second solution candidate G to which a maximum evaluation value S (GN_best) is given, among the equally extracted second solution candidates G, as the second solution candidate GN_best, but there is a problem in that it is not possible to determine whether the second solution candidate GN_best is truly most suitable with respect to RNA expressed matrix data D among the solution candidate groups GN_set that are enumerated and indexed as a binary decision diagram, which fall within the degree of divergence N from the current first solution candidate G_x. For this reason, in order to step into an intervene experiment that needs a large amount of cost, for example, an uncertain process depending on personal efforts such as a process of minutely examining the first solution candidate G_x by a biologist to determine validity has been necessary.

In the preferable embodiment of the invention, it is possible to easily find out optimality of the first solution candidate G_x that is considered to be optimal.

In order to find out the optimality of the first solution candidate G_x that is considered to be optimal, a maximum evaluation value (first maximum evaluation value) Z among evaluation values in a case where solutions of a number that exceeds the number of the extracted second solution candidates G are assumed is estimated.

<Estimation of First Maximum Evaluation Value Z>

Specifically, when U and V represent natural numbers, respectively, (U×V) second solution candidates G are equally extracted, and an evaluation value S is given to each second solution candidate G. Here, U represents sizes of blocks, and V represents the number of blocks. U and V are set as certain large numbers. For example, U and V may be set to 10,000. In this case, the number of the equally extracted second solution candidates G becomes one hundred million (=10,000×10,000).

The (U×V) second solution candidates G are divided into V blocks, and a segment maximum value among evaluation values S of U second solution candidates G for each block is acquired. Accordingly, it is possible to acquired V segment maximum values. Further, assuming that the V segment maximum values follow a generalized extreme value distribution (GEV), a maximum evaluation value (the first maximum evaluation value Z) is estimated with a maximum likelihood.

The first maximum evaluation value Z is accompanied by a statistical support. A graph {G} in a solution space is originally a finite set, and strictly speaking, is degenerated. However, since a total number of the second solution candidates G is sufficiently large, continuous distribution approximation may be applied. In this case, since an upper limit is obviously present in the evaluation value S, it is expected that a Gumbel type is obtained by appropriately setting U and V, and thus, it is possible to estimate a real first maximum evaluation value Z with a confidence interval.

The evaluation values S corresponding to the equally extracted second solution candidates G are compared with the estimated first maximum evaluation value Z with the confidence interval, and it is determined whether the evaluation value S of each second solution candidate G is within the confidence interval of the first maximum evaluation value Z on the basis of the comparison result. In a case where the evaluation value S of each second solution candidate G is within the confidence interval of the first maximum evaluation value Z, it can be understood that the second solution candidate G is one best second solution candidate GN_best in an entire solution space ("the second solution candidate GN_best is sufficient").

In a case where Z>>S(G_x), a difference between both the evaluation values may be converted into a distance on a solution space, and it may be estimated how far the second solution candidate G that is currently estimated is away from the true second solution candidate GN_best (second solution candidate G corresponding to the first maximum evaluation value Z).

Subsequently, it is determined whether the second solution candidate G (local solution) considered to be optimal is within the confidence interval of the estimated first maximum evaluation value Z. Further, in a case where the second solution candidate G is within the confidence interval of the first maximum evaluation value Z, it may be determined that the second solution candidate G is the second solution candidate GN_best (one of global solutions) that is the best second solution candidate G in the whole area of the search space (solution space within the degree of divergence N). The above-described determination (optimal sufficiency determination of whether the second solution candidate GN_best satisfies a sufficient condition) is one of features of the determination of the second solution candidate GN_best.

Here, in the case of the optimal sufficiency determination, it is possible to determine whether a local solution is a global solution, but it is not possible to determine whether the local solution is a unique global solution. Accordingly, even in a case where the optimal sufficiency determination of the second solution candidate GN_best (local solution) is successful, there is a possibility that another equivalent solution may be present, and thus, "inadequacy" remains in the search.

Accordingly, in a case where the optimal sufficiency of the second solution candidate GN_best is successful, a maximum evaluation value (second maximum evaluation value) W is estimated from evaluation values of the second solution candidates G in a solution space (partial space) of which the degree of divergence N from the first solution candidate G_x is within a first range (a degree of divergence N1) and outside a second range (a degree of divergence N2).

<<Estimation of Second Maximum Evaluation Value W>

The estimation of the second maximum evaluation value W is performed by assigning an evaluation value S corresponding to each of the second solution candidates G on a partial space of which the degree of divergence N from the first solution candidate G_x is within the first range (the degree of divergence N1) and outside the second range (the degree of divergence N2) and estimating a maximum evaluation value (second maximum evaluation value W) among evaluation values in a case where a number that exceeds the number of the extracted second solution candidates G is assumed on the basis of the assigned evaluation values S.

Specifically, the estimation of the second maximum evaluation value W is performed by the same method as the estimation of the first maximum evaluation value Z. That is, when P and Q represent natural numbers, respectively, P×Q solutions (second solution candidates G) are equally extracted, and the evaluation value S is assigned to each of the second solution candidates G. Here, P represents sizes of blocks, and Q represents the number of blocks. P and Q may be the same as U and V equally extracted when the first maximum evaluation value Z is estimated, or may be different therefrom.

P×Q graphs G are divided into Q blocks, and then, a segment maximum value is acquired from the evaluation values S of U second solution candidates G for each block. Accordingly, Q segment maximum values may be acquired. Further, assuming that the Q segment maximum values follow a generalized extreme value distribution (GEV), a second maximum evaluation value W is estimated with a maximum likelihood.

Further, the evaluation value S(GN_best) corresponding to the second solution candidate GN_best for which the optimal sufficiency determination is successful is compared with the second maximum evaluation value W with the estimated confidence interval, and it is determined whether the evaluation value S(GN_best) of the second solution candidate GN_best exceeds the second maximum evaluation value W (a range of the second maximum evaluation value W with the confidence interval) on the basis of the comparison result.

Since the first maximum evaluation value Z is obtained by estimating a maximum value in the whole area of the search space, and the second maximum evaluation value W is obtained by estimating a maximum value in a partial space, basically, it is obvious that W≤Z (there is also a case in which W>Z is stochastically obtained, in accordance with sizes of samples, or the like).

Here, in a case where S(GN_best)>>W (outside a confidence interval, for example), the second solution candidate GN_best is a solution candidate that is assigned the first maximum evaluation value Z, and additionally, in the range separated from the first solution candidate G_x on the search space, it may be determined that there is no graph structure capable of explaining the RNA expressed matrix data D at the same level or higher in a range separated from the first solution candidate G_x in a search space.

It is necessary that the second range (the degree of divergence N2) separated from the first solution candidate G_x is set in advance, but the second range may be set from features of a graph, or may be empirically set. For example, the degree of divergence N2 for separation may be gradually increased until S(GN_best)>>W is reached. For example, an appropriate degree of divergence N2 may be efficiently searched for in a repeated manner by binary search or the like from a setting value of a sufficiently large degree of divergence N2.

In this regard, in a case where the degree of divergence N2 is zero, W≅Z, which leads to a constant result as optimal sufficiency determination. Further, in a case where the degree of divergence N2 is a shortest degree of divergence N2 other than zero, only the second solution candidate GN_best is excluded. Thus, unless the degree of divergence N2 is set to a value of a considerable extent, it is considered that it is difficult to obtain a large difference in results.

Thus, in a case where the evaluation value S(GN_best) exceeds the second maximum evaluation value W, it can be understood that the degree of divergence N2 corresponds to a unique second solution candidate GN_best in the whole area of the search space ("the second solution candidate GN_best is necessary and sufficient"). That is, it may be determined that the best solution candidate G other than the second solution candidate GN_best is not present.

In a case where the optimal sufficiency determination of the second solution candidate GN_best is successful, it is common to subsequently perform optimal necessity determination, but in a case where a second solution candidate G determined due to a certain reason is present, solution candidates in a range separated from the second solution candidate G and the second solution candidates S may be used means for direct comparison.

In the related art heuristic search, for example, a method for performing repetitive search on the basis of studies such as randomly changing initial values or assigning noise to data has also been used, but this method is no more than a heuristic determination method. On the other hand, the determination of the second solution candidate GN_best according to the embodiment of the invention is a method based on a statistical ground.

Figure 17:
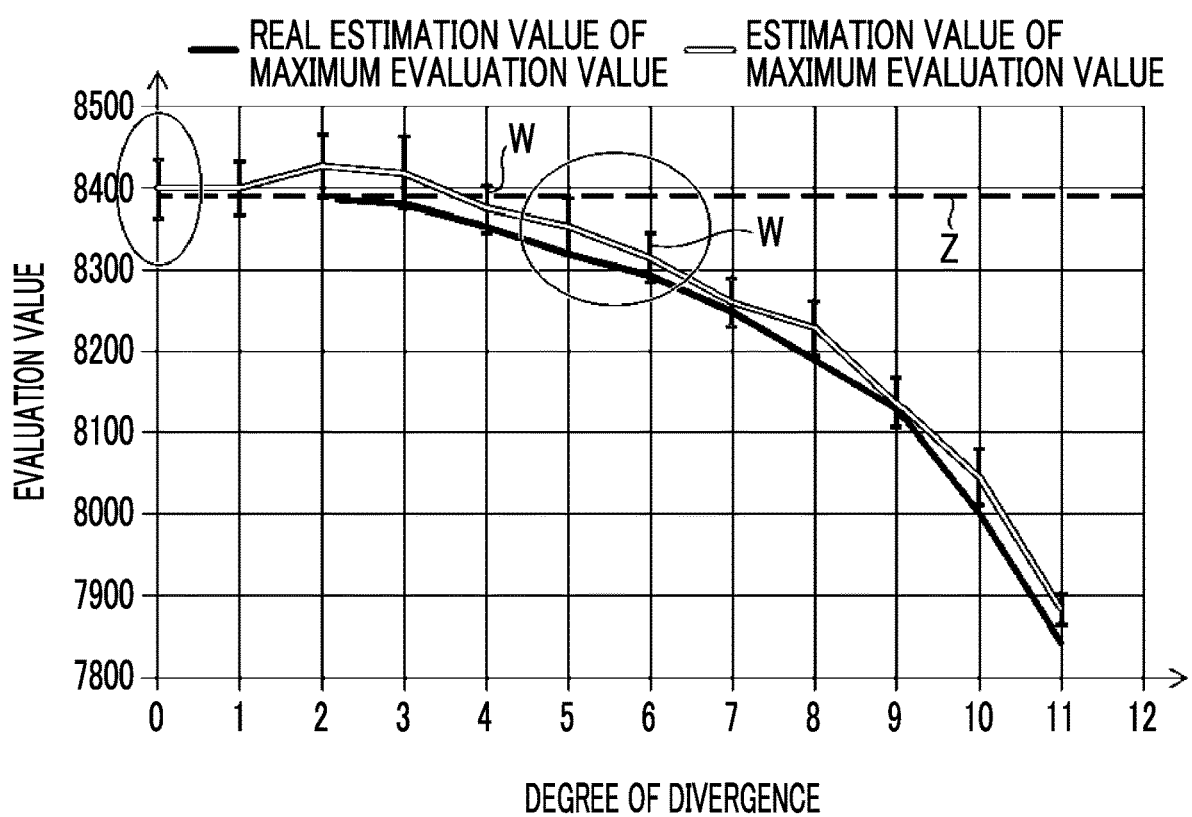
FIG. 17 is a graph used for explaining a determination example of a best second solution candidate with respect to certain gene control network estimation.

FIG. 17 is a graph used for explaining a determination example of the second solution candidate GN_best with respect to certain gene control network estimation.

The transverse axis of the graph shown in FIG. 17 represents the degree of divergence, and the longitudinal axis represents an evaluation value. A dashed line represents an achievement evaluation value (first maximum evaluation value Z) with respect to the second solution candidate GN_best. Further, a while line represents an estimation value of an optimal value with respect to each degree of divergence.

Since an optimal value estimation range where the degree of divergence is zero contains an achievement evaluation value, it is determined that the achievement evaluation value is an optimal value.

As the degree of divergence increases, a value corresponding to an estimation range gradually decreases, and the estimation range (second maximum evaluation value W) is outside the achievement evaluation value at the degree of divergence 5 to 6. Accordingly, it is determined that the second solution candidate value S having an evaluation value that is equal to or larger than that of the second solution candidate GN_best is not present in a range that is equal to or larger than the degree of divergence 5 to 6.

Further, a solid line represents measurement values corresponding to second solution candidates obtained in heuristic search, which shows that the first maximum evaluation value Z and the second maximum evaluation value W can be correctly estimated with respect to the second solution candidates.

The estimation of the first maximum evaluation value Z, the estimation of the second maximum evaluation value W, and the determination of the second solution candidate GN_best based on the first maximum evaluation value Z and the second maximum evaluation value W may be performed by the controller 110 that generally controls the respective processing sections. Alternatively, the estimation of the first maximum evaluation value Z, the estimation of the second maximum evaluation value W, and the determination of the second solution candidate GN_best may be performed by individual processing sections.

By using the first maximum evaluation value Z and the second maximum evaluation value W that are estimated as described above, it is possible to determine whether the second solution candidate GN_best is truly most suitable for the RNA expressed matrix data D among the solution candidate groups GN_set of which the degree of divergence from the current first solution candidate G_x is equal to or smaller than N. In this case, since a constructed ZDD can be shared in both of the search for the best second solution candidate GN_best and the estimation of the first maximum evaluation value Z and the second maximum evaluation value W, the efficiency is particularly high.

Through the above-described processes, it is possible to efficiently search the gene control network G for accurately explaining the RNA expressed matrix data D. In this way, by accurately estimating G, it is possible to easily perform stratification of patients, estimation of a chemical agent mechanism, and decision making of an intervene experiment thereof.

<Optimal Solution Search Method>

Figure 18:
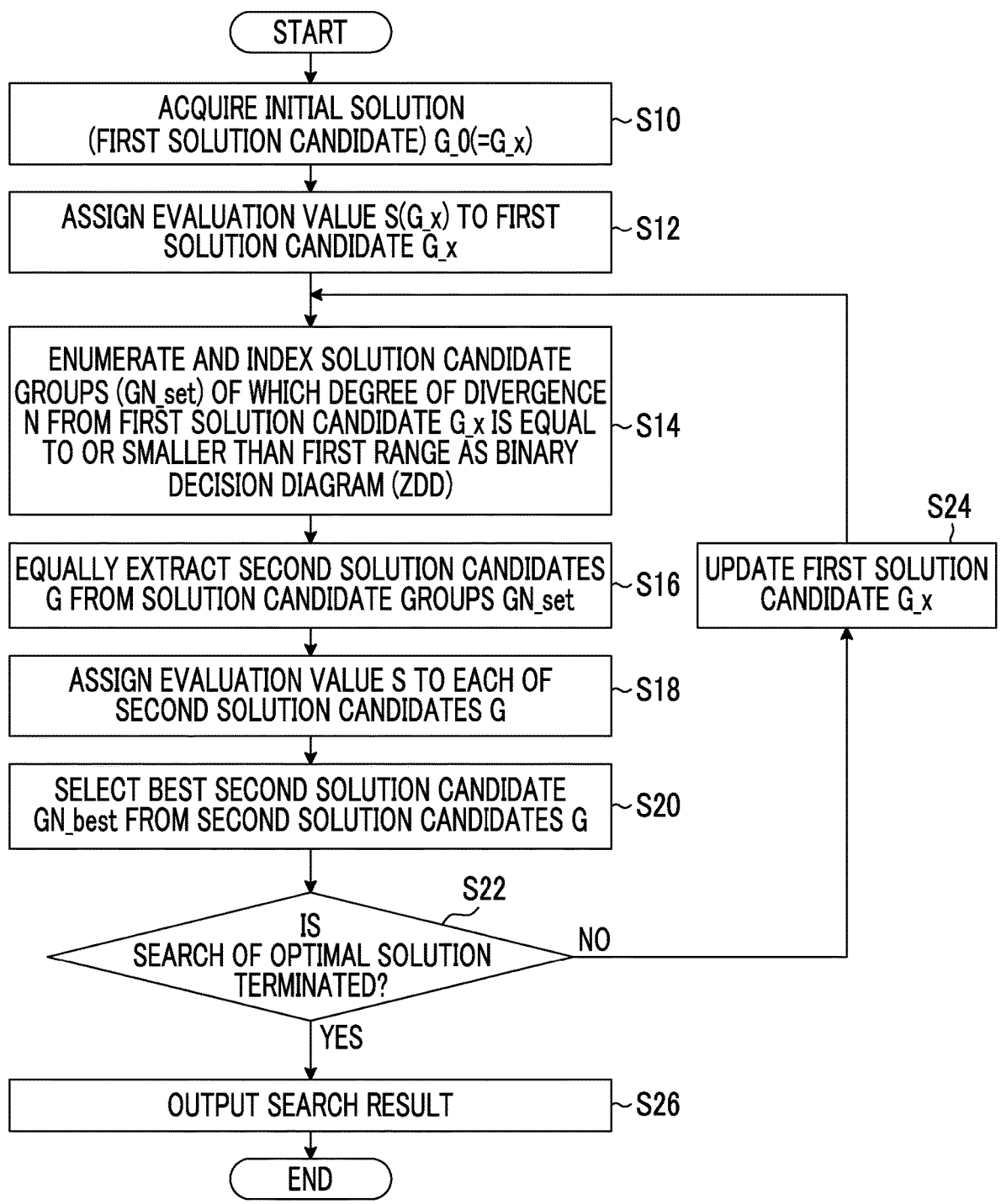
FIG. 18 is a flowchart showing an embodiment of an optimal solution search method according to the invention.

FIG. 18 is a flowchart showing an embodiment of an optimal solution search method according to the invention.

In FIG. 18, the solution candidate acquisition unit 100 shown in FIG. 5 first acquires an initial solution G_0 (=G_x) (step S10, a first step). The evaluation value assignment section 106 assigns an evaluation value S(G_x) to the acquired first solution candidate value G_x (in this case, the initial solution G_0) (step S12, a second step).

The enumeration indexing section 102 enumerates and indexes solution candidate groups GN_set of which the degree of divergence N from the first solution candidate G_x (the initial first solution candidate G_x is the initial solution G_0) is equal to or smaller than a first range as a binary decision diagram (step S14, a third step). In this example, the solution candidate groups GN_set are enumerated and indexed by a path enumeration indexing algorithm that uses the ZDD as described above.

Further, in a case where the solution candidate groups GN_set of which the degree of divergence from the first solution candidate G_x is equal to or smaller than N are enumerated and indexed using the ZDD, it is preferable to impose a certain restriction condition C in accordance with the type of a combinatorial optimization problem.

The restriction condition C may be imposed on the basis of a model or prior knowledge. For example, since a cyclic graph cannot be expressed in the Bayesian network model, a graph G expressed as a gene control network should not be a cyclic graph. Further, in a case where a scale free network characteristic is expected by prior knowledge, it may be considered that such a restriction condition C is provided. Further, there is a case where it is preferable that the restriction condition C is not particularly considered according to the type of a combinatorial optimization problem.

Figure 19:
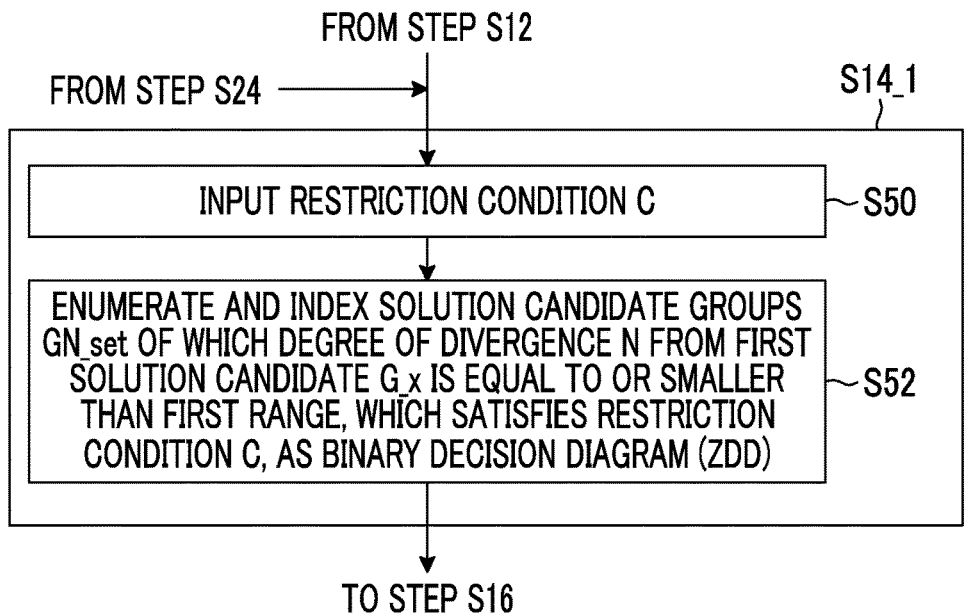
FIG. 19 is a flowchart showing step S14_1 for enumerating and indexing solution candidate groups in consideration of a restriction condition C, applied instead of step S14 for enumerating and indexing solution candidate groups shown in FIG. 18.

FIG. 19 shows a step S14_1 in a case where the restriction condition C is considered, applied instead of step S14 in FIG. 18.

In FIG. 19, the optimal solution search apparatus 10 includes a restriction condition reception section (a keyboard 30, a mouse 32, or the like) that receives a restriction condition C of one or more solution candidates, and the enumeration indexing section 102 receives the restriction condition C from the restriction condition reception section (step S50, a seventh step).

The enumeration indexing section 102 enumerates and indexes the solution candidate groups GN_set of which the degree of divergence N from the first solution candidate G_x is equal to or smaller than a first range, which satisfies the restriction condition C, as a binary decision diagram using the ZDD (step S52).

Returning to FIG. 18, the solution candidate extraction section 104 equally extracts a part or the entirety of the solution candidate groups GN_set from the enumerated and indexed solution candidate groups GN_set as a second solution candidate G (step S16, a fourth step).

Subsequently, the evaluation assignment section 106 assigns evaluation values S to the equally extracted second solution candidates G (step S18, a fifth step). For example, an evaluation function S(D, G) obtained by quantifying how much the second solution candidate G can explain the RNA expressed matrix data D is prepared, and the evaluation value assignment section 106 acquires the evaluation values S corresponding to the equally extracted second solution candidates G on the basis of the evaluation function S(D, G), and assigns the acquired evaluation values S to the second solution candidates G.

Then, the search termination determining section 108 selects the second solution candidate GN_best that is the best solution candidate G among the second solution candidates G on the basis of the evaluation values S assigned to the second solution candidates G (step S20).

The search termination determining section 108 determines whether search for an optimal solution (first optimal solution) is terminated on the basis of the evaluation value S(G_x) of the current first solution candidate G_x and one or more evaluation values among the evaluation values S assigned to the second solution candidates G (step S22, a sixth step). Specifically, in a case where the current first solution candidate G_x matches the second solution candidate GN_best selected in step S20 (for example, in a case where the evaluation value S(G_x) of the current first solution candidate G_x matches the evaluation value S(GN_best) assigned to the second solution candidate GN_best), it is determined that the search for the optimal solution is terminated in a whole area of a solution space in a combinatorial optimization problem.

In step S22, in a case where it is determined that search for the optimal solution is not terminated (in the case of "No"), the controller 110 updates a solution candidate different from the current first solution candidate G_x, which is at least one solution candidate selected from the second solution candidates G, as the next first solution candidate G_x (step S24), and then, the procedure proceeds to step S14. For example, the next first solution candidate G_x may be replaced with the second solution candidate GN_best, and an evaluation value S(G_x_) of the next first solution candidate G_x may be set as the evaluation value S(GN_best) assigned to the second solution candidate GN_best.

Further, in step S22, the processes of steps S14 to S24 are repeated until it is determined that the search for the optimal solution is terminated. As a result, as described in FIG. 2, the first solution candidate G_x is updated to a first solution candidate G_x with a higher evaluation value one after another. Here, search ranges (N_0, N_1, N_2, . . . ) of which the degree of divergence from the first solution candidate G_x is equal to or smaller than N are also updated one after another. The degree of divergence N may be a constant value, or may be a value that varies whenever the first solution candidate G_x is updated. For example, it may be considered that a large value is first given as the degree of divergence N and the degree of divergence N is gradually updated to a small value whenever the first solution candidate G_x is updated.

On the other hand, in step S22, in a case where it is determined that the search for the optimal solution is terminated (in the case of "Yes"), the controller 110 that functions as an output section outputs the current first solution candidate G_x as an optimal solution (first optimal solution) G_1 (=GN_best) (step S26).

The determination of whether the search for the optimal solution is terminated in step S22 is not limited to the above-described embodiment, and for example, it may be determined that the search for the optimal solution is terminated in a case where a difference between the evaluation value S(GN_best) of the second solution candidate GN_best and the evaluation value S(G_x) of the current first solution candidate G_x is smaller than a threshold value ΔS corresponding to an error (S(GN_best)−S(G_x)<ΔS). This is because, in this case, an improvement rate of the evaluation value S(G_x) of the first solution candidate G_x becomes small and a desired optimal solution can be obtained even though the search is terminated in this stage.

Further, in a case where the number of repetitions of the processes of steps S14 to S24 (the number of updatings of the first solution candidate G_x) reaches a predetermined number, it may be determined that the search for the optimal solution is terminated. The predetermined number depends on the size of the entire solution space and the size of the degree of divergence N from the first solution candidate G_x, but it is preferable that the predetermined number is a number of times at which it is considered that the first solution candidates G_x converge.

<Selection Method of Second Solution Candidate GN_Best>

Next, a selection method (determination result) of the second solution candidate GN_best in step S20 shown in FIG. 18 will be described.

<First Determination Method of Second Solution Candidate GN_Best>

Figure 20:
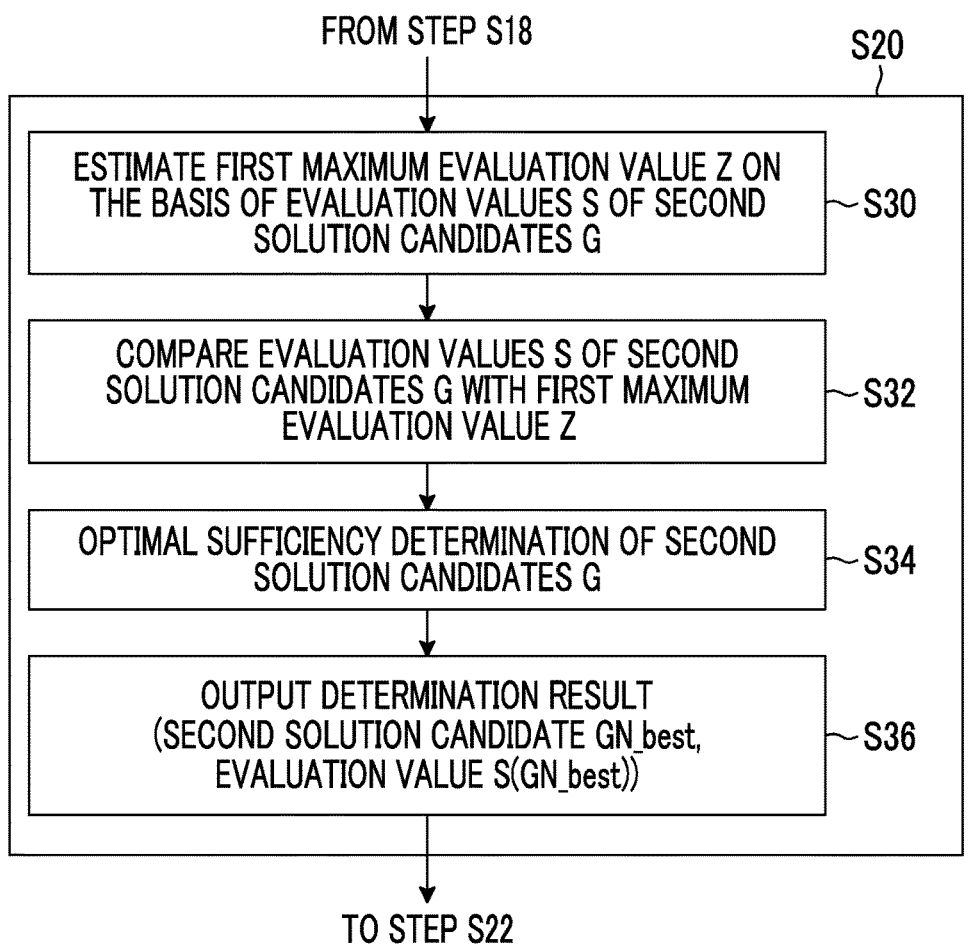
FIG. 20 is a flowchart showing a first determination method of a second solution candidate GN_best in step S20 shown in FIG. 18.

FIG. 20 is a flowchart showing a first determination method of the second solution candidate GN_best in step S20 shown in FIG. 18.

In FIG. 20, a maximum evaluation value S in a case where solutions G of a number that exceeds the number of second solution candidates G are assumed, which are assigned the evaluation values S in step S18 (FIG. 18), is estimated as a first maximum evaluation value Z on the basis of the evaluation values S of the equally extracted second solution candidates G (step S30, an eighth step).

Specifically, when U and V represent natural numbers, respectively, the second solution candidates G correspond to (U×V) solutions G. The (U×V) solutions G are divide into V blocks, and V segment maximum values of evaluation values S of U solutions G for each block are obtained. Further, assuming that the V segment maximum values follow a generalized extreme value distribution, a maximum evaluation value (the first maximum evaluation value Z with the confidence interval) is estimated with a maximum likelihood.

Subsequently, the evaluation values S of the second solution candidates G are compared with the estimated first maximum evaluation value Z with the confidence interval (step S32), and it is determined whether the evaluation value S of each second solution candidate G is within the range of the confidence interval of the first maximum evaluation value Z on the basis of the comparison result (step S34, a ninth step). That is, in a case where the evaluation value S of the second solution candidate G is within the confidence interval of the first maximum evaluation value Z, it is determined that the second solution candidate G satisfies a sufficient condition as the best solution (second solution candidate GN_best) in the solution candidate groups GN_set that are enumerated and indexed as a binary decision diagram using the ZDD (it is determined that optimal sufficiency is present).

The second best solution candidate G for which it is determined that there is optimal sufficiency is output as the second solution candidate GN_best (step S36). The evaluation value S assigned to the second solution candidate GN_best is set as an evaluation value S(G_best).

In this way, it is possible to select (determine) the second solution candidate GN_best having optimal sufficiency as a true optimal value. Further, since the ZDD to be constructed can be shared in both of the search for the second solution candidate GN_best and the estimation of the first maximum evaluation value Z, the efficiency is excellent.

Further, even in a case where the optimal sufficiency determination fails, it may be suggested that there is another optimal solution due to insufficient heuristic search. Further, it may be claimed that the solution candidate is close to an optimal solution to some extent, according to the level of failure. In addition, the solution candidate may be used while noticing that there is another optimal solution. That is, regardless of the success or failure of the optimal sufficiency determination, information about the determination of the optimal sufficiency is useful.

In a case where the optimal sufficiency determination based on the procedure shown in FIG. 20 fails, the same heuristic search may be repeated on the basis of different settings or the likes, but a method for preparing a plurality of search methods (a first search method, a second search method, and the like) for performing heuristic search in advance and performing switching between the plurality of search methods for use may be considered.

Figure 21:
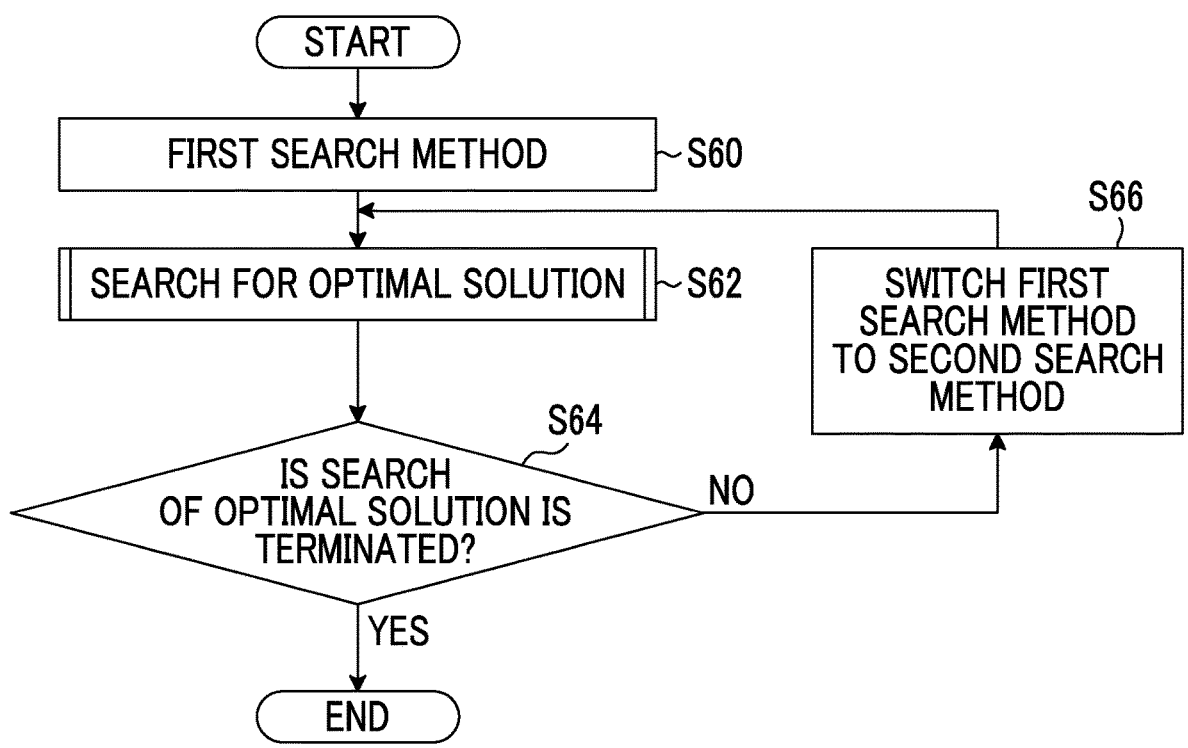
FIG. 21 is a flowchart showing a modification example of the optimal solution search method shown in FIG. 18.

FIG. 21 is a flowchart showing a modification example of the optimal solution search method shown in FIG. 18.

As the heuristic search method, a first search method in which the cost for computation is small (a search time is short) and the accuracy of a solution is low, and a second search method in which the cost for computation is larger than that of the first search method (a search time is long) and the accuracy of a solution is high are prepared.

In FIG. 21, the first search method is first applied (step S60). In step S62 (particularly, step corresponding to step S14) for executing search for an optimal solution by the optimal solution search method shown in FIG. 18, solutions searched for by the first search method are enumerated and searched for as the solution candidate groups GN_set, and then, the search for the optimal solution is executed.

Subsequently, it is determined whether the search for the optimal solution is terminated in a state where the optimal solution is searched for (step S64).

In a case where the search for the optimal solution is terminated in a state where the optimal solution is not searched for (in the case of "No"), the first search method is switched to the second search method (step S66), and then, the procedure proceeds to step S62. Thus, in step S62, solutions searched for by the second search method are enumerated and searched for as the solution candidate group GN_set, and then, the search for the optimal solution is executed.

In a case where the search for the optimal solution is terminated in a state where the optimal solution is searched for (in the case of "Yes"), the search is terminated.

The switching between the search methods may be switching between heuristic search methods. Alternatively, switching to an approximation algorithm having a similarity guaranteed to some extent, a method for obtaining an exact solution, or the like may be performed. Further, three or more search methods may be prepared for sequential switching. The switching between the search methods is not limited to the methods, but may also be realized by convergence determination of the same search method, or the like. For example, in a search method for enhancing accuracy by a repetitive search, a method for determining a predetermined number of search results using a first maximum evaluation value Z and repeating search until reaching the confidence interval of the first maximum evaluation value Z may be used.

Further, in this case, the first maximum evaluation value Z for determining optimal sufficiency acquired in advance.

In a case where the search for the optimal solution is terminated using the first search method, the switching between the search methods is not performed.

<Second Determination Method of Second Solution Candidate GN_Best>

FIG. 22 is a flowchart showing a second determination method of the second solution candidate GN_best in step S20 shown in FIG. 18, and particularly, shows a process of determining optimal necessity performed after it is determined that the search for the optimal solution is terminated (that is, after the optimal sufficiency determination is successful) in step S22 shown in FIG. 18.

In FIG. 22, among the second solution candidate groups GN_set that are included in the solution candidate groups of which the degree of divergence from the current first solution candidate G_x is equal to or smaller than the first range (the degree of divergence N1), the second solution candidate groups GN_set of which the degree of divergence from the second solution candidate G (that is, the second solution candidate GN_best for which the optimal sufficiency determination is successful) of which the evaluation value S is determined to be within the confidence interval of the first maximum evaluation value Z is outside the second range (the degree of divergence N2) are enumerated and indexed as a binary decision diagram (step S70, a tenth step). The degree of divergence N2 is a value smaller than the degree of divergence N1 (N2<N1). Further, the second solution candidate groups GN_set are enumerated and indexed as the binary decision diagram using the ZDD.

Subsequently, a part or of the entirety of the second solution candidate groups GN_set are equally extracted as third solution candidates G from the enumerated and indexed second solution candidate groups GN_set (step S72, an eleventh step).

The evaluation values S are assigned to the equally extracted third solution candidates G (step S74, a twelfth step). The assignment of the evaluation values S to the third solution candidates G may be performed in the same manner as in step S18 shown in FIG. 18.

Then, a maximum evaluation value S in a case where solutions of a number that exceeds the number of the third solution candidates are assumed is estimated as a second maximum evaluation value W on the basis of the evaluation values S assigned to the third solution candidates G (step S76, a thirteenth step). The estimation of the second maximum evaluation value W may be performed in the same manner as in step S30 shown in FIG. 20.

Specifically, in a case where P and Q represent natural numbers, respectively, the third solution candidates G become (P×Q) solutions G, and (P×Q) solutions G are divided into Q blocks, and Q segment maximum values among evaluation values S of P solutions G for each block is acquired. Further, assuming that the segment maximum values follow a generalized extreme value distribution, a maximum evaluation value (the second maximum evaluation value W with the confidence interval) is estimated with a maximum likelihood using Q segment maximum values.

Subsequently, the evaluation value S(GN_best) of the second solution candidate GN_best that is within the confidence interval of the first maximum evaluation value Z is compared with the second maximum evaluation value W (step S78), and it is determined whether the evaluation value S of the second solution candidate GN_best exceeds the second maximum evaluation value W on the basis of the comparison result (step S80, a fourteenth step). The evaluation value S(GN_best) corresponding to the second solution candidate GN_best for which the range of the second maximum evaluation value W with the confidence interval is successful is compared with the estimated second maximum evaluation value W with the confidence interval, and it is determined whether the evaluation value S(GN_best) of the second solution candidate GN_best exceeds the second maximum evaluation value W (the range of the second maximum evaluation value W with the confidence interval) on the basis of the comparison result.

In a case where the evaluation value S(GN_best) of the second solution candidate GN_best exceeds the second maximum evaluation value W, it may be determined that there is no same solution as that of the second solution candidate GN_best and the second solution candidate GN_best satisfies a necessary condition as a unique optimal solution (that optimal necessity is achieved).

<Modification Example of Second Determination Method of Second Solution Candidate GN_Best>

A modification example of the second determination method of the second solution candidate GN_best includes a process in a case where the optimal necessity determination of the second solution candidate GN_best fails, in the second determination method of the second solution candidate GN_best shown in FIG. 22.

That is, in a case where the optimal necessity determination fails, in step S70 shown in FIG. 22, the processes of step S70 to step S80 shown in FIG. 22 are performed by applying a third range (the degree of divergence N3: N3>N2) obtained by enlarging the second range instead of the second range (the degree of divergence N2).

Further, in a case where the optimal necessity determination fails, the processes of step S70 to step S80 shown in FIG. 22 may be repeated plural times while gradually enlarging the third range until the necessity determination is successful.

[Others]

The optimal solution search apparatus 10 of this embodiment is merely exemplary, and the invention may be applied to other configurations. Respective functional configurations may be appropriately realized by suitable hardware, software, or combinations thereof. For example, the invention may be applied to an optimal solution search program for causing a computer to execute the processes in the respective sections of the optimal solution search apparatus 10, and a computer-readable recording medium (non-transitory recording medium) on which the optimal solution search program is recorded.

Further, in this embodiment, for example, a hardware structure of processing sections that execute various processes, such as the solution candidate acquisition section 100, the enumeration indexing section 102, the solution candidate extraction section 104, the evaluation value assignment section 106, the search termination determining section 108, the controller 110, and the like, corresponds to a variety of processors as follows. The variety of processors includes a central processing unit (CPU) that is a general-purpose processor that functions as a variety of processing sections by executing software (program), a programmable logic device (PLD) that is a processor capable of changing a circuit configuration after manufacturing, such as a field programmable gate array (FPGA), an exclusive electric circuit that is a processor having a circuit configuration that is exclusively designed for executing a specific process, such as an application specific integrated circuit (ASIC), and the like.

One processing section may be configured of one processor among the above-mentioned various processors, or may be configured of the same type or different types of two or more processors (for example, a plurality of FPGAs, or a combination of a CPU and an FPGA). Further, a plurality of processing sections may be formed as one processor. As an example in which the plurality of processing sections is formed as one processor, first, there is a form in which one processor is formed by a combination of one or more CPUs and software and the processor functions as a plurality of processing sections, as represented by a computer such as a client or a server. Second, as represented by a system on chip (SoC) or the like, there is a form in which a processor that realizes entire functions of a system including a plurality of processing sections into one integrated circuit (IC) chip is used. As described above, the various processing sections may be configured using one or more processors among the above-described various processors as a hardware structure.

Further, the hardware structure of the various processors is, more specifically, an electric circuit (circuitry) in which circuit devices such as a semiconductor device are combined.

In addition, according to the invention, in an optimal solution search apparatus that includes a processor, the processor acquires at least one solution among solutions that belong to a solution space of the combinatorial optimization problem as a first solution candidate, assigns an evaluation value to the first solution candidate, enumerates and indexes solution candidate groups of which the degree of divergence from the first solution candidate is equal to or smaller than a first range as a binary decision diagram, in which the binary decision diagram is a ZDD or has a data structure similar to the ZDD, equally extracts a part or the entirety of the solution candidate groups from the enumerated and indexed solution candidate groups as second solution candidates, assigns evaluation values to the extracted second solution candidates, and determines whether search for a first optimal solution is terminated on the basis of the evaluation value of the first solution candidate and one or more evaluation values among the evaluation values of the second solution candidates. In a case where it is determined that the search for the first optimal solution is not terminated, a solution candidate different from the first solution candidate, which is at least one solution candidate selected from the second solution candidates, is updated as the first solution candidate, and the processes are repeated until it is determined that the search for the first optimal solution is terminated, and in a case where it is determined that the search for the first optimal solution is terminated, the first solution candidate that is assigned the evaluation value for which it is determined that the search is terminated is output as the first optimal solution.

In addition, the invention is not limited to the above-described embodiments, and various modifications may be made in a range without departing from the concept of the invention.

EXPLANATION OF REFERENCES

10: optimal solution search apparatus
12: CPU
14: main memory
16: graphic board
18: communication interface
20: hard disk drive
22: optical disc drive
24: keyboard controller
26: mouse controller
28: monitor device
30: keyboard
32: mouse
40: database
50: network
100: solution candidate acquisition section
102: enumeration indexing section
104: solution candidate extraction section
106: evaluation value assignment section
108: search termination determining section
110: controller
Z: first maximum evaluation value
W: second maximum evaluation value

What is claimed is:

1. An optimal solution search method for searching for an optimal solution in a combinatorial optimization problem using a computer, comprising:
a first step of acquiring at least one solution among solutions that belong to a solution space of the combinatorial optimization problem as a first solution candidate;
a second step of assigning an evaluation value to the first solution candidate;
a third step of enumerating and indexing solution candidate groups of which a degree of divergence from the first solution candidate is equal to or smaller than a first range as a binary decision diagram, in which the binary decision diagram has a data structure in which the combinable patterns is contracted to be enumerated and indexed, by using at least one of a step of reducing patterns to be identified by identifying whether to decide, on the basis of a part of combinations among combinable patterns in the combinatorial optimization problem, solutions to be unsuitable without consideration of the remaining combinations and a step of reducing patterns to be identified by extracting a common portion of pattern groups in which a difference is present in only a part of combinations among the combinable patterns and sharing the remaining combinations, wherein the degree of divergence is defined by a hamming distance;
a fourth step of equally extracting a part or the entirety of the solution candidate groups from the enumerated and indexed solution candidate groups as second solution candidates;
a fifth step of assigning evaluation values to the extracted second solution candidates; and
a sixth step of determining whether search for a first optimal solution is terminated on the basis of the evaluation value of the first solution candidate and one or more evaluation values among the evaluation values of the second solution candidates,
wherein in a case where it is determined that the search for the first optimal solution is not terminated, at least one solution candidate selected from the second solution candidates and different from the first solution candidate is updated as the first solution candidate and the processes from the third step to the sixth step are repeated, and
in a case where it is determined that the search for the first optimal solution is terminated, the first solution candidate that is assigned the evaluation value for which it is determined that the search for the first optimal solution is terminated is output as the first optimal solution,
wherein the degree of divergence of the first range is a value that varies whenever the first solution candidate is updated, and
wherein the degree of divergence is a large value for a first time and gradually updated into a small value for each repetition,
wherein the optimal solution search method further comprises:
a seventh step of receiving a restriction condition of one or more solution candidates,
wherein the combinatorial optimization problem is a combinatorial optimization problem of a gene control network,
wherein the third step is performed for enumerating and indexing the solution candidate groups of which the degree of divergence from the first solution candidate is equal to or smaller than the first range, which satisfies the restriction condition, as a binary decision diagram, and
wherein the restriction condition includes at least whether or not a cyclic graph is already generated by employed edges in the gene control network, and whether or not the number of employed edges is the same.

2. The optimal solution search method according to claim 1,
wherein the degree of divergence of the first range is equal to or greater than 1 and is equal to or smaller than a maximum degree of divergence in which enumerating and indexing as the binary decision diagram is possible.

3. The optimal solution search method according to claim 1,
wherein the degree of divergence of the first range is equal to or greater than 1 and is equal to or smaller than a maximum degree of divergence in which enumerating and indexing as the binary decision diagram is possible.

4. The optimal solution search method according to claim 1,
wherein the sixth step is performed for determining that the search for the first optimal solution is terminated in a case where the evaluation value of the first solution candidate is equal to or greater than the evaluation values of all the second solution candidates, in a case where a difference between each second solution candidate and the first solution candidate is equal to or smaller than a predetermined value, or in a case where the number of repetitions of the processes of the third step to the sixth step reaches a predetermined number of times.

5. The optimal solution search method according to claim 1,
wherein the sixth step is performed for determining that the search for the first optimal solution is terminated in a case where the evaluation value of the first solution candidate is equal to or greater than the evaluation values of all the second solution candidates, in a case where a difference between each second solution candidate and the first solution candidate is equal to or smaller than a predetermined value, or in a case where the number of repetitions of the processes of the third step to the sixth step reaches a predetermined number of times.

6. The optimal solution search method according to claim 1,
wherein a solution candidate different from the first solution candidate, which is updated as the first solution candidate, is a second solution candidate that is assigned a maximum evaluation value among the second solution candidates.

7. The optimal solution search method according to claim 1,
wherein a solution candidate different from the first solution candidate, which is updated as the first solution candidate, is a second solution candidate that is assigned a maximum evaluation value among the second solution candidates.

8. The optimal solution search method according to claim 1, further comprising:
an eighth step of estimating a maximum evaluation value in a case where solutions of a number that exceeds the number of the second solution candidates are assumed as a first maximum evaluation value, on the basis of the evaluation values of the second solution candidates assigned in the fifth step; and
a ninth step of determining whether the evaluation value of each second solution candidate is within a confidence interval of the first maximum evaluation value, and
wherein the sixth step is performed for determining whether the search for the first optimal solution is terminated on the basis of the evaluation value of the first solution candidate and the evaluation values of the second solution candidates determined to be within the confidence interval of the first maximum evaluation value.

9. The optimal solution search method according to claim 1, further comprising:
an eighth step of estimating a maximum evaluation value in a case where solutions of a number that exceeds the number of the second solution candidates are assumed as a first maximum evaluation value, on the basis of the evaluation values of the second solution candidates assigned in the fifth step; and
a ninth step of determining whether the evaluation value of each second solution candidate is within a confidence interval of the first maximum evaluation value, and
wherein the sixth step is performed for determining whether the search for the first optimal solution is terminated on the basis of the evaluation value of the first solution candidate and the evaluation values of the second solution candidates determined to be within the confidence interval of the first maximum evaluation value.

10. Non-transitory computer readable recording medium storing an optimal solution search program for causing a computer to execute the optimal solution search method according to claim 1.

11. The optimal solution search method according to claim 8,
wherein the equally extracted second solution candidates are U×V solutions, where U and V are natural numbers, respectively, and
wherein the eighth step includes dividing the U×V solutions into V blocks, acquiring V segment maximum values of evaluation values of U solutions for each block, and estimating the first maximum evaluation value using the V segment maximum values on the assumption that the segment maximum values follow a generalized extreme value distribution.

12. The optimal solution search method according to claim 8,
wherein a first search method in which the cost for computation is small and the accuracy of a solution is low and a second search method in which the cost for computation is larger than that of the first search method and the accuracy of a solution is high are prepared, and
wherein the third step is performed for enumerating and indexing solutions that are first searched for by the first search method as the solution candidate groups, and for enumerating and indexing solutions searched for by the second search methods as the solution candidate groups only in a case where the evaluation values of the second solution candidates are not within the confidence interval of the first maximum evaluation value.

13. The optimal solution search method according to claim 8, further comprising:
a tenth step of enumerating and indexing, among the second solution candidate groups that are included in the solution candidate groups of which the degree of divergence from the first solution candidate is equal to or smaller than the first range, the second solution candidate groups of which the degree of divergence from the second solution candidate of which the evaluation value is determined to be within the confidence interval of the first maximum evaluation value is outside a second range that is narrower than the first range as a binary decision diagram, in which the binary decision diagram has a data structure in which the combinable patterns are contracted to be enumerated and indexed, by using at least one of a step of reducing patterns to be identified by identifying whether to decide, on the basis of a part of combinations among combinable patterns in the combinatorial optimization problem, solutions to be unsuitable without consideration of the remaining combinations and a step of reducing patterns to be identified by extracting a common portion of pattern groups in which a difference is present in only a part of combinations among the combinable patterns and sharing the remaining combinations;

an eleventh step of equally extracting a part or the entirety of the second solution candidate groups from the enumerated and indexed second solution candidate groups as third solution candidates;

a twelfth step of assigning evaluation values to the extracted third solution candidates;

a thirteenth step of estimating a maximum evaluation value in a case where solutions of a number that exceeds the number of the third solution candidates are assumed on the basis of the evaluation values of the third solution candidates assigned in the twelfth step as a second maximum evaluation value; and a fourteenth step of determining whether the evaluation values of the second solution candidates that are within the confidence interval of the first maximum evaluation value exceed the second maximum evaluation value.

14. The optimal solution search method according to claim 13,
wherein the equally extracted third solution candidates are P×Q solutions, where P and Q are natural numbers, respectively, and
wherein the thirteenth step includes dividing the P×Q solutions into Q blocks, acquiring Q segment maximum values of evaluation values of P solutions for each block, and estimating the second maximum evaluation value on the assumption that the segment maximum values follow a generalized extreme value distribution using the Q segment maximum values.

15. The optimal solution search method according to claim 13,
wherein in a case where it is determined in the fourteenth step that the evaluation values of the second solution candidates that are within the confidence interval of the first maximum evaluation value do not exceed the second maximum evaluation value, the processes from the tenth step to the fourteenth step are performed by applying a third range obtained by enlarging the second range instead of the second range.

16. An optimal solution search apparatus that searches an optimal solution in a combinatorial optimization problem, comprising:
a processor configured to
acquire at least one solution among solutions that belong to a solution space of the combinatorial optimization problem as a first solution candidate,
enumerate and index solution candidate groups of which a degree of divergence from the first solution candidate is equal to or smaller than a first range as a binary decision diagram, in which the binary decision diagram has a data structure in which the combinable patterns are contracted to be enumerated and indexed, by using at least one of a step of reducing patterns to be identified by identifying whether to decide, on the basis of a part of combinations among combinable patterns in the combinatorial optimization problem, solutions to be unsuitable without consideration of the remaining combinations and a step of reducing patterns to be identified by extracting a common portion of pattern groups in which a difference is present in only a part of combinations among the combinable patterns and sharing the remaining combinations, wherein the degree of divergence is defined by a hamming distance, equally extract a part or the entirety of the solution candidate groups from the enumerated and indexed solution candidate groups as second solution candidates, assign evaluation values to the first solution candidate and the second solution candidates, respectively, determine whether search for a first optimal solution is terminated on the basis of the evaluation value of the first solution candidate and one or more evaluation values among the evaluation values of the second solution candidates, update a solution candidate different from the first solution candidate, which is at least one solution candidate selected from the second solution candidates, as the first solution candidate and repeatedly execute process for equally extracting the part or the entirety of the solution candidate groups from the enumerated and the indexed solution candidate groups as the second solution candidates, process for respectively assigning the evaluation values to the first solution candidate and the second solution candidates, and process for determining whether search for the first optimal solution is terminated on the basis of the evaluation value of the first solution candidate and one or more evaluation values among the evaluation values of the second solution candidates, in a case where it is determined that the search for the first optimal solution is not terminated, and output, in a case where it is determined that the search for the first optimal solution is terminated, the first solution candidate that is assigned the evaluation value for which it is determined that the search is terminated as the first optimal solution, wherein the degree of divergence of the first range is a value that varies whenever the first solution candidate is updated, wherein the degree of divergence is a large value for a first time and gradually updated into a small value for each repetition, and wherein the combinatorial optimization problem is a combinatorial optimization problem of a gene control network;

wherein the processor is further configured to:
receive a restriction condition of one or more solution candidates, and
enumerate and index the solution candidate groups of which the degree of divergence from the first solution candidate is equal to or smaller than the first range, which satisfies the restriction condition, as a binary decision diagram, wherein the restriction condition includes at least whether or not a cyclic graph is already generated by employed edges in the gene control network, and whether or not the number of employed edges is the same.

* * * * *